United States Patent [19]
Schwartz et al.

[11] Patent Number: 5,905,988
[45] Date of Patent: May 18, 1999

[54] METHOD AND APPARATUS FOR DATABASE TRANSFORMATION AND ADAPTIVE PLAYBACK

[75] Inventors: David M. Schwartz, San Carlos; Leonard W. Kain, San Jose, both of Calif.

[73] Assignee: ImaginOn, San Carlos, Calif.

[21] Appl. No.: 08/748,445

[22] Filed: Nov. 13, 1996

[51] Int. Cl.$^6$ ............................................. G06F 17/00
[52] U.S. Cl. ........................ 707/104; 707/100; 707/103
[58] Field of Search ................................ 707/104, 100, 707/103

[56] References Cited

U.S. PATENT DOCUMENTS

| | | | |
|---|---|---|---|
| 5,241,671 | 8/1993 | Reed et al. ............................. | 707/104 |
| 5,317,732 | 5/1994 | Gerlach et al. ........................ | 707/104 |
| 5,408,655 | 4/1995 | Oren et al. ............................. | 707/501 |
| 5,475,835 | 12/1995 | Hickey .................................. | 707/104 |
| 5,481,704 | 1/1996 | Pellicano .............................. | 707/5 |
| 5,515,490 | 5/1996 | Buchanan et al. .................... | 345/302 |
| 5,546,529 | 8/1996 | Bowers et al. ........................ | 345/348 |
| 5,550,966 | 8/1996 | Drake et al. .......................... | 707/104 |
| 5,553,281 | 9/1996 | Brown et al. ......................... | 707/104 |
| 5,577,254 | 11/1996 | Gilbert .................................. | 707/104 |
| 5,584,006 | 12/1996 | Reber et al. .......................... | 395/427 |
| 5,584,025 | 12/1996 | Keithley et al. ...................... | 707/104 |

OTHER PUBLICATIONS

Alsop, 1996, "PointCast and Its Wannabes," *Fortune* pp. 181–182, Nov. 1996.
Gunther, 1996, "The Cable Guys' Big Bet on the Net," *Fortune* pp. 102–105, 108, Nov. 1996.
Tweney, 1996, "Searching is my Business: A Gumshoe's Guide to the Web," *PC World* 182–196, Dec. 1996.

*Primary Examiner*—Thomas G. Black
*Assistant Examiner*—Donald Min
*Attorney, Agent, or Firm*—Pennie & Edmonds LLP

[57] ABSTRACT

A method and apparatus are described for transforming information obtained from a database into a presentation network topology for seamless serial presentation of selected data items to a user. The presentation network topology is a multidimensional network synthesized according to a predetermined set of rules, using information from the database and using selection parameters provided by the user. The presentation network topology is constructed so as to allow for adaptive playback, wherein a next data item is selected according to the position of the current data item with respect to the presentation network topology and according to at least one playback command provided by the user. The presentation network topology is also constructed so as to allow for automated playback, wherein data items are automatically, serially, and seamlessly presented to the user when no playback command is received, according to the historical choices of the user.

34 Claims, 13 Drawing Sheets

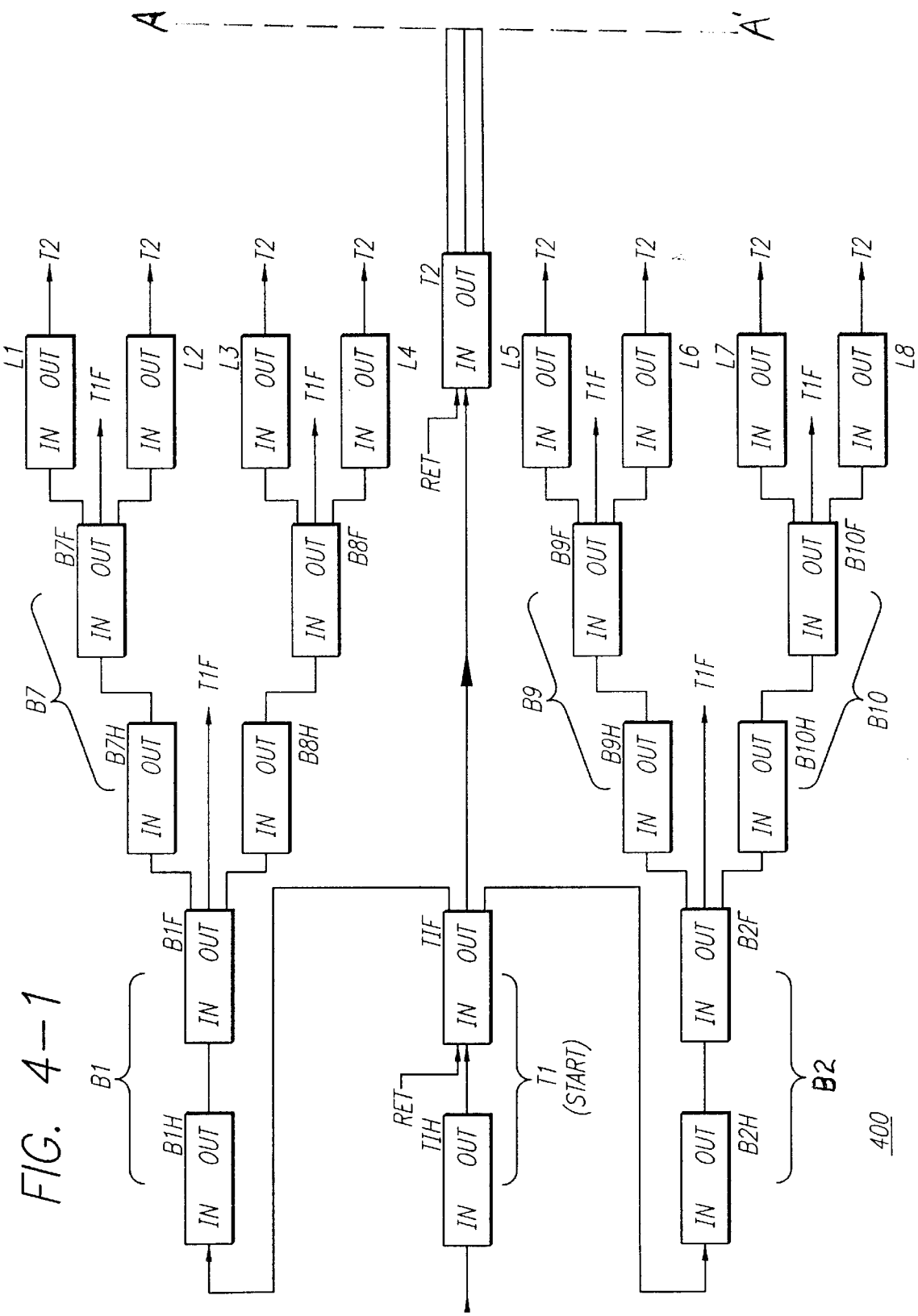

NETWORK INTERFACE MODULE

METHOD AND APPARATUS FOR DATABASE TRANSFORMATION AND ADAPTIVE PLAYBACK

CROSS REFERENCE TO APPENDICES

Appendix A, which is part of the present disclosure, is a printout of pseudocode from which program code can be written for transforming and adaptively playing back information obtained from a large database such as the Internet in accordance with a preferred embodiment of the present invention.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of database transformation. In particular, the present invention relates to a method and apparatus for arranging information taken from a large database into an organizational topology that allows for seamless, sequential presentation of at least a subset of this information to a user.

BACKGROUND OF THE INVENTION

Concurrent with advances in data storage technology, computing power, and data communications technology, a large amount of information is available to the computer user. This information may include text files, images, audio clips, video clips, computer programs, movie scripts, biological or medical data items, or other information that has been stored in digital format. FIG. 1 is a conceptual diagram showing how this information may be stored and presented. Specifically, FIG. 1 shows a computer 100 having a processor 101, a monitor 102 for visual display, speakers 104 for audio presentation, a keyboard 106 and mouse 108 for receiving commands from a user, and a hard drive 110 for localized storage of information. Also shown in FIG. 1 are remote databases 112, 113, and 114 coupled to computer 100 by means of a network 116. Although many variations of the configuration of FIG. 1 may be used, the hard drive 110 is usually capable of storing only a relatively small amount of information. In one common configuration, the network 116 is the Internet, and databases 112–114 are any of a variety of miscellaneous nodes connected to the Internet.

In general, the speed of presentation of database information to a user at computer 100 is relatively fast when the desired information is contained directly on the hard drive 110, and is relatively slow when the desired information needs to be accessed from the remote databases 112–114. The current level of technology generally allows the user to submit a search request to any of a variety of pre-indexed search engines and to receive in response a set of pointers to database nodes that may contain the desired information.

If the network 116 is the Internet, these pointers are commonly known as Universal Resource Locators or URLs. The user receives these URLs in a prioritized flat file listing. The user may then access the database nodes corresponding to these pointers one at a time.

In many cases the overall database formed by remote databases such as databases 112–114 forms a hierarchical relational database, each database node generally containing pointers to other database nodes. In this case, at any given database node the user may follow pointers to a successive sequence of database nodes, many of which may not be listed in the prioritized flat file listing generated by the search engine. In this way, the user may serially navigate through the large preexisting database hierarchy.

The current level of technology in database presentation has several drawbacks. For example, the current level of technology is not well adapted for serial presentation of items taken from multiple databases having many boundaries and differing formats. Presently, the serial navigation of the user is constrained by the preexisting database hierarchy, in that the next serial database node is either (a) constrained to the set of pointers at the present node, many of which may be irrelevant to the overall search desires of the user, or (b) constrained to the flat file listing given by the search engine, each data pointer in the flat file being generally unrelated to any other data pointer.

This causes seams in the serial presentation of data, in that the next data item is often either (a) unrelated to the desired search parameters, as when pointers are followed into the existing hierarchy that are not listed in the flat file generated by the search engine, or (b) related to the search parameters but highly unrelated to the previous data item, as when the flat file listing generated by the search engine is strictly followed by the user. Symptoms of seams in the serial presentation of data items according to the present technology include slow access times to desired information, defunct data sets or locations, recirculating pointers, and "dead-end" data items.

When data is being presented for a combination of entertainment and educational purposes, as is often the case when the remote databases 112–114 are nodes on the World Wide Web portion of the Internet, seams cause the aesthetics of the serial presentation process to be perceived as less desirable, because the user must "back out" of unrelated or serially disjointed data items. The undesired presence of seams in the serial presentation of data is often exacerbated by the slowness of data transmission across large networks such as the Internet. If the serial presentation of data items were instantaneous from one data item to the next, the presence of seams might be more acceptable to the user, who could instantaneously back out of an unrelated or serially disjointed data item. However, if each data item takes a period of time (even as short as a few seconds) to present, the presence of seams can be a disadvantage to the user, who must view or hear an undesired portion of data while the next candidate item is retrieved.

One prior art method that attempts to solve one of the above problems is directed to a method for off-line downloading of entire hierarchical databases onto a user's local hard drive for non-real time viewing. Such a method is embodied in a commercial product named "WebWhacker," sold by Forefront Technologies, Inc. However, in this method there is merely a direct copying of a portion of the existing hierarchical database structure onto the user's local hard drive. In particular, the same hierarchical structure is maintained. While serial presentation of the database items is expedited, from one item to the next, the same limitations associated with the existing hierarchy are present, still causing seams in the serial presentation of data items to the user.

The current level of technology in database presentation has further shortcomings related to the serial presentation of database information to the user. In particular, the user is required to actively participate in decisions and issue affirmative commands after the presentation of each data item. When the number of results obtained from a search is large, even indexed displays may require large numbers of keystrokes and excessive viewing time to experience an item of interest. Conventional data presentation methods such as graphical browsers and relational database formatted-field displays require the user to indicate what the next display screen will be, and when it will be displayed. Typically, the user accomplishes this by clicking on a "next" button or a line of displayed hypertext called a "hot-link". It may be desirable for the user to experience the serial presentation of the desired data without being required to issue such commands, while the presented sequence of data items is still being relevant to the desires of the user.

Accordingly, there remains a need in the art for a method for serially presenting data in a large database according to desired search parameters of a user in a seamless manner.

Additionally, there remains a need in the art for a method for fast serial presentation of desired data items stored at remote database locations, despite the presence of real-time delays associated with the downloading of information from these remote databases.

Additionally, there remains a need in the art for a method which provides automated serial presentation of the desired data items, in that affirmative commands from the user after the presentation of each data item are not required.

Even further, there remains a need in the art for a method which provides adaptive serial presentation of the desired data items, wherein affirmative commands from the user after the presentation of each data item are not required, and wherein the data items serially presented are selected according to past commands issued by the user.

SUMMARY OF THE INVENTION

The preferred embodiments meet these needs by providing a method and apparatus for transforming information obtained from a first database, the first database comprising data items, into a presentation network for seamless serial presentation of selected data items to a user, the presentation network being formed according to a presentation network topology. The presentation network topology is a multidimensional network synthesized according to a predetermined set of rules, using information from the first database and using selection parameters provided by the user. The presentation network is constructed to allow for adaptive playback, wherein a next data item is selected according to the position of the current data item with respect to the presentation network and according to at least one playback command provided by the user. The presentation network is also constructed so as to allow for automated adaptive playback, wherein the next data item is selected according to the position of the current data item with respect to the presentation network and according to previous playback commands provided by the user.

In one preferred embodiment, a method is provided for reorganizing and presenting information from the first database. The method comprises the steps of: (a) receiving one or more selection parameters; (b) selecting a subset of data items in the first database, the subset being chosen according to the selection parameters; (c) creating a second database comprising a presentation network having a plurality of data pointers, each data pointer pointing to a data item of the subset of data items, the data pointers being arranged according to a presentation network topology, the presentation network topology being determined according to the selection parameters and the data content of the data items; and (d) presenting the subset of data items in a time sequence, the time sequence being determined according to the presentation network and according to at least one playback instruction.

In particular, the presentation network comprises a plurality of nodes, wherein each node comprises a unique entry identifier, a data pointer, and an exit pointer, and each exit pointer comprises the entry identifier of a node different from the node containing that exit pointer. Importantly, the data pointed to by the data pointer may be downloaded into a local database from the first database before the step of presenting the subset of data items. In this manner, successive data items may be presented to the user in a rapid manner.

Each node may have a plurality of exit pointers including a first exit pointer, a second exit pointer, and a default exit pointer. The step of presenting the subset of data items comprises the steps of presenting a node data item and receiving a playback command. The playback command is equal to one of plurality of options comprising a first pointer command, a second pointer command, and a null command. Responsive to this playback command, a subsequent node data item is presented to the user, the subsequent node having an entry identifier equal to (a) the first pointer of the previous node, if the playback command is equal to the first pointer command, (b) the second pointer of the previous node, if the first playback command is equal to the second pointer command, or (c) the default exit pointer of the previous node, if the first playback command is equal to the null command.

The null command is indicated when no affirmative command is received from the user. In this way, one form of automated presentation is enabled when no affirmative input is received, wherein the data items of nodes pointed to by default exit pointers are successively presented to the user.

In one preferred embodiment, the presentation network topology has a tree structure, each of the nodes being one of a trunk node, branch node, or leaf node. The presentation network topology comprises a primary path formed by a series combination of trunk nodes, and further comprises a plurality of secondary paths coupled to the primary path at the trunk nodes. Each secondary paths comprises at least one branch node or leaf node. One or more trunk nodes may contain null data pointers, wherein these trunk nodes couple branch nodes and leaf nodes to the presentation network but do not present their own data item when encountered during playback.

According to a preferred embodiment, the presentation of the data items may be according to an automatic adaptive playback methodology. In one form of the preferred embodiment, the step of presenting the subset of data items comprises the step of automatically selecting the first or second exit pointer if the previous M playback commands were each equal to the null command. The automatic selection may be based on prior playback commands or the historical preferences of the user. In another form, the step of presenting the subset of data items comprises the step of, upon an explicit autoplay instruction or upon M sequential null playback commands, adaptively selecting a third exit pointer different from the first and second exit pointer, for jumping to a nonadjacent tree node according to an adaptive algorithm. The adaptive algorithm may be customized to both current preferences and historical preferences of the user.

Advantageously, the serial presentation of data items is interactive and adaptive yet also seamless. The data items may include text, graphics, video clips, audio clips, biological or medical data items, or any kind of data that is capable of being stored in a computer database. Methods according to the preferred embodiments may be adapted for other applications including film authoring and playback, and automated testing of computer programs.

DETAILED DESCRIPTION

The structure and function of the preferred embodiments can best be understood by reference to the drawings. The reader will note that the same reference designations appear in multiple locations. Where this is the case, the numerals refer to the same or corresponding structure or steps in those locations.

The preferred embodiments of the present invention include methods and systems for transforming information obtained from a first database, the first database comprising data items, into a presentation network for seamless serial presentation of selected data items to a user. The presentation network allows for adaptive and automated presentation of the data items to the user, for further enhancing the seamless presentation.

The following discussion will be divided into two general parts. First, a preferred embodiment will be described which can be applied to any of a variety of databases, including any type of hierarchical or flat-file database. Second, an example of a specific implementation is described, in which the source database is a set of database nodes connected to the World Wide Web portion of the Internet.

Figure 1:
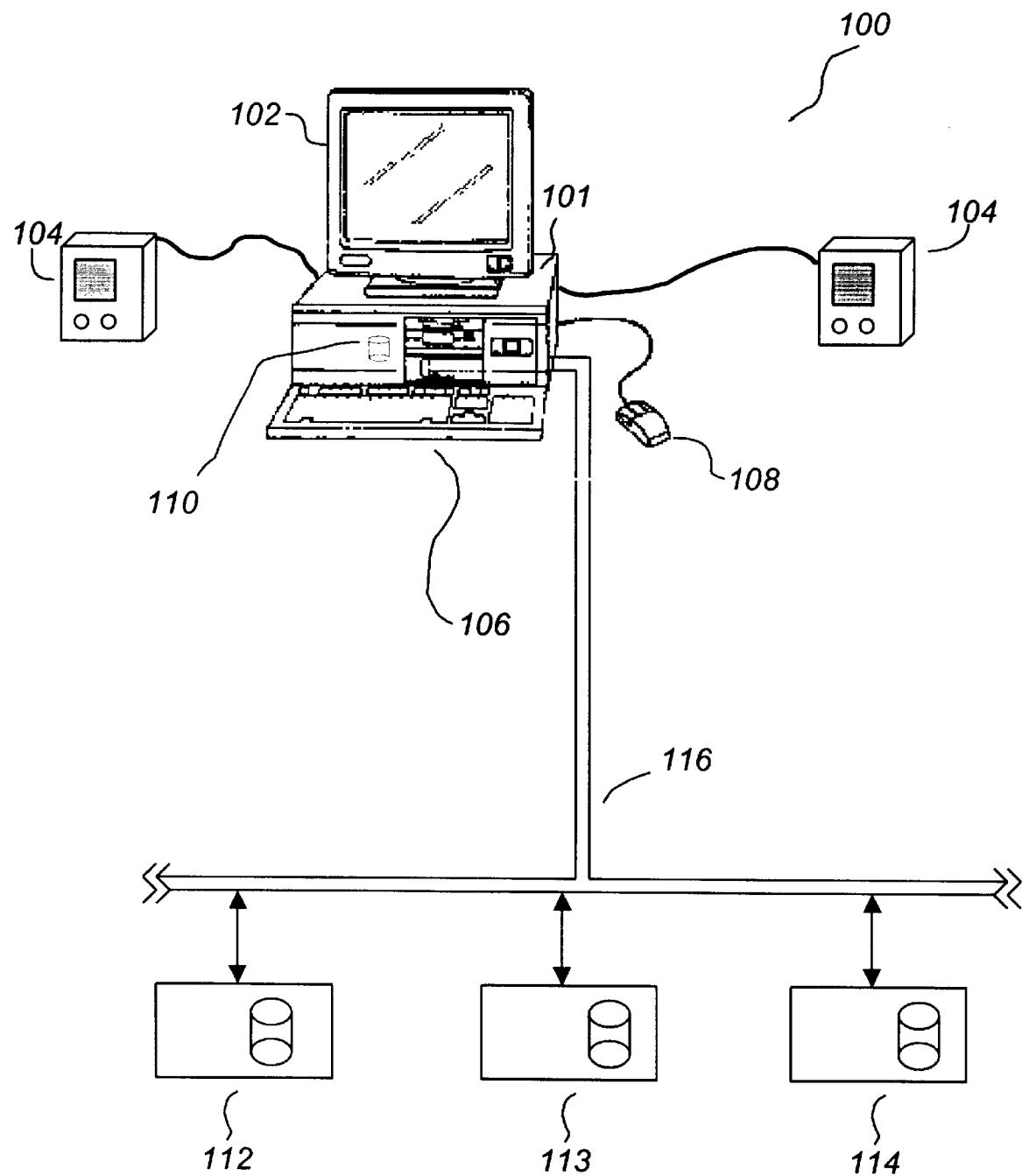
FIG. 1 shows a computer system coupled to a network of information databases, the computer system being capable of presenting data items to a user.
Figure 2A:
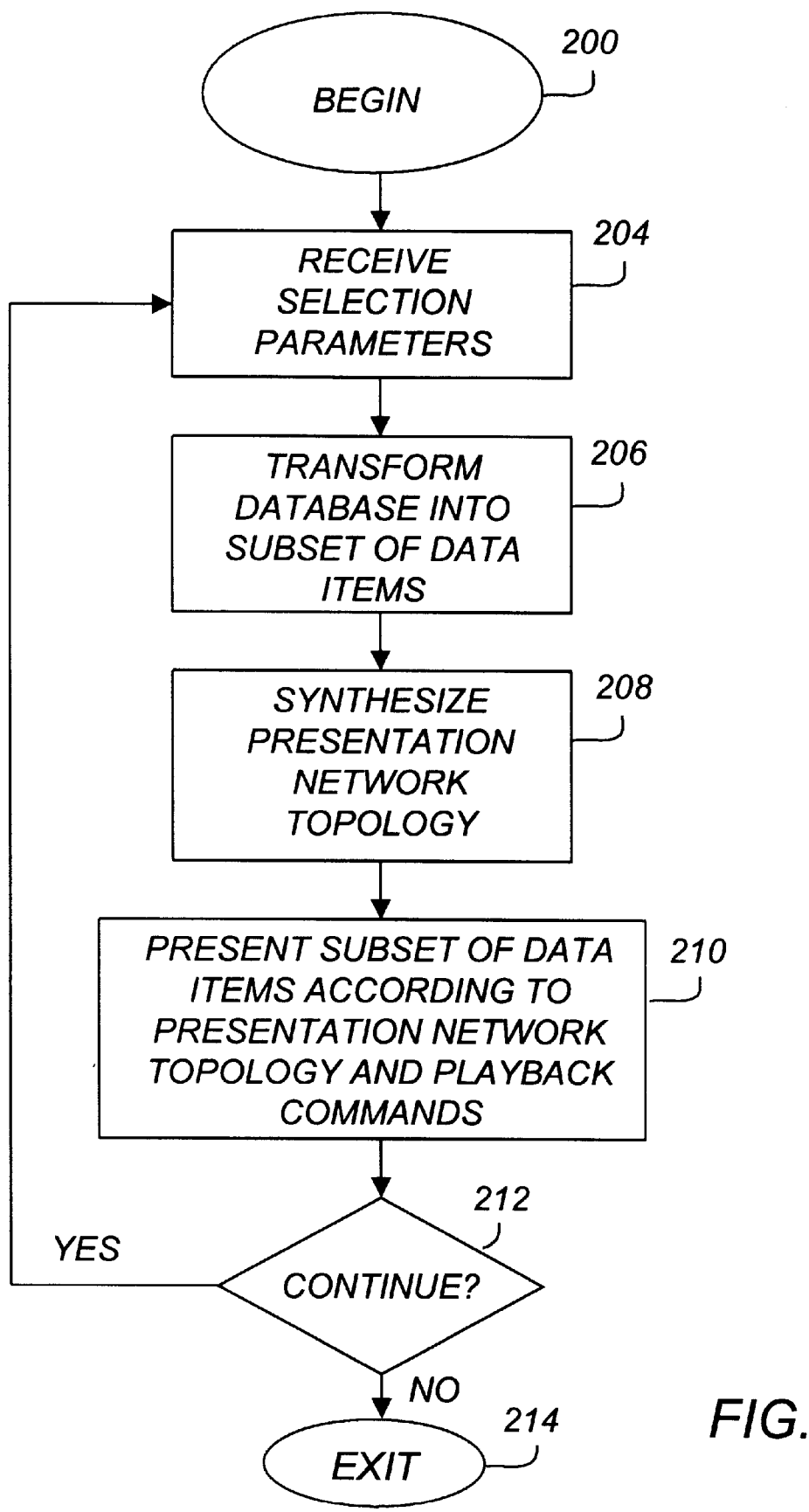
FIG. 2A is a flow chart illustrating a process according to a preferred embodiment.

FIG. 2A is a flow chart showing a database transformation and adaptive playback method according a preferred embodiment. After beginning (step 200) selection parameters are received (step 204). Selection parameters may be obtained directly from the user using keyboard 106. Alternatively, selection parameters may be obtained from the memory of computer 100 or from across the network 116 (see FIG. 1) according to any of a variety of algorithms. For example, a pre-packaged set of search parameters that is known, for example, to achieve a desired type of data according to the user's characteristics may be retrieved.

FIG. 2A further shows a step 206 for transforming a source database into a subset of data items in accordance with the present invention. The source database may contain any type of data in any of a variety of formats, and may range from a single, flat file to a large, broadly distributed database such as the set of database nodes connected to the Internet. The source database may even consist of a single file located on the hard drive 110 of computer 100.

FIG. 2A further shows a step 208 for synthesizing a presentation network topology in preparation for interactive and adaptive presentation of the subset of data items to the user. Importantly, the steps 206 and 208 may be carried out in any order, or may be performed concurrently. FIG. 2A further shows a step 210 for serially presenting the subset of data items according to the presentation network topology and according to playback commands, if any, provided by the user. Finally, at step 212, the user may initiate another transformation and playback process at the node 204, or may exit the process at a step 214.

A database transformation of the type represented by step 206 is generally a process by which a source database structure and its contents are converted into an output database that has a specified relationship to the source according to a transform function. As discussed previously, the source database may consist of data items such as text files, directories of filenames, images, video clips, or a network of data servers. Importantly, the output database may contain pointers to data items, and does not necessarily need to contain the data items themselves.

The input to the transform function is the source database; the output database represents a subset of the source database. The transform function may be a simple masking operation (for example, selecting those database items containing each of a set of search words), or may be a more complex filter that takes into account relationships among data items. The transform function can also be "tuned," that is, filters appropriate to the source database and the user's selection parameters can be designed or selected to create an output suited to the user's particular needs.

For example, a preferred transform function may include a temporal filter. An example of the application of a temporal filter is the updating of the output database by sampling the source database at specific time intervals. A preferred transform function may also comprise a spatial filter. An example of the application of a spatial filter is a mask that can delete content from the subset of selected items to meet storage requirements.

The above filters may also be adapted for frequency domain filtering, where the frequency domain corresponds to the temporal or spatial filter as appropriate. For example, a low-pass temporal filtering operation may be achieved by sampling the source database at time intervals that are generally greater than the rate at which the source database is updated. A low-pass spatial frequency operation may be achieved by finding database hits according to the search selection parameters, aligning those database hits according to their addresses in an address space, and then only sampling a database hit if it falls along every "kth" address in the address space (where k is an integer).

In general, temporal frequency domain filtering may be performed in much the same way that sampled digital signals are filtered in a digital signal processing system, except that the fundamental sampling frequency of the digital signal processing system is replaced by the rate at which the source database is updated. Spatial frequency domain filtering may also be performed in much the same way that sampled digital signals are filtered in a digital signal processing system, with the implied time dimension of the digital signal processing system being replaced by the address space of the source database. A logical space involving generalized data relationships may be also used instead of the address space as the basis for a frequency domain filter.

It has been found that when the source database is sampled in an appropriate sampling space such as the above temporal, spatial, or logical spaces, any of a variety of digital signal processing filtering techniques can be applied to the database transformation. Such techniques include decimating, bandpass filtering, high-pass filtering, low-pass filtering, comb filtering, shelving, and notch filtering.

A preferred database transformation may include a combination of the above filtering techniques. For example, in one application of a preferred embodiment, the source database comprises those nodes connected to the World Wide Web (WWW) portion of the Internet. Each source database node has a multiplicity of data items. The output database generated through the use of a preferred database transformation represents pointers to specified data items. Performing a lossy data compression transform on the WWW according to the search parameters produces a condensed format output suitable for high-speed access during playback in the following ways:

1. Reduction in scope of the database. The number of data items made available for processing is less than the number of data items available in the source network. The scope is determined by storage availability and download time limitations.
2. Decimation of the number of data items within the scope of the process. Many data items (or data pointers to those data items) processed are deleted. The extent to which a selected data item matches the search parameters is saved as a data array. Data items may also be selected by other filtering functions.
3. Bandpass filtering of the data items within each node. Only a fraction of the data items within a node are reformatted and pointed to. The parameters of the filter are set by the user or may be set by default. As discussed previously, filtering may be performed by data class (audio, video, still image, text, etc.), by time (for example, only take the data pertaining to specific dates), by frequency of update (for example, only take data that is updated hourly), by spatial parameters (for example, take data from twenty geographically diverse sites), or by other criteria.
4. Where the source database is a hierarchical database comprising data items having pointers to other data items, pointer information is reduced or deleted. Since only qualified data items are pointed to by the output database, all of the pointers representing unused nodes along the path to a selected node can be replaced with a single vector. This vector is a synthetic link that never existed in the source database. Likewise, all unused pointers pointing out of a data item are deleted, except those at terminal data items (those at the end of a series of linked data items). Any unused outward pointing pointers at terminal data items are saved for future use, in particular for use in a future transformation starting from that terminal data item.

Referring again to FIG. 2A, the step of synthesizing a presentation network according to a presentation network topology is represented by step 208. A preferred presentation network topology is generally a multidimensional tree-like data structure comprising trunk nodes, branch nodes, and leaf nodes constructed according to a set of rules. Tree-like network topologies are known in the art, one example being presented in U.S. Pat. No. 5,553,281 to Brown et al, entitled "Method for Computer-Assisted Media Processing," the contents of which are hereby incorporated by reference.

A unique aspect of a preferred presentation network topology is an implied time axis connecting successive nodes. Spatial navigation of the tree structure is perceived by the user as a serial and interactive presentation of data items selected from the source database.

The nodes of the presentation network are stored in a local database using hardware such as the disk drive 110 of computer 100 (see FIG. 1). The presentation network comprises a primary path formed by a series combination of trunk nodes, and a plurality of secondary paths comprising at least one branch node or leaf node. Branch nodes are pointed to by trunk nodes or other branch nodes, and point to other branch nodes or to leaf nodes in the presentation network. Leaf nodes are pointed to by branch nodes or trunk nodes, and represent the termination of a secondary path.

Each trunk node, branch node, or leaf node contains a pointer to the actual physical location of the data item it references, as well as pointers to any other node to which it is linked in the tree structure. In particular, each node comprises a unique entry identifier, a data pointer, and an exit pointer, each exit pointer comprising the entry identifier of a node different from the node containing that exit pointer. One or more trunk nodes may contain null data pointers, wherein these trunk nodes couple branch nodes and leaf nodes to the presentation network, but do not present their own data item when encountered during serial playback.

When the presentation network is embodied as a schematic drawing, the objects are graphic library elements that are similar to flowchart nodes, and the links are defined in a text file known as a "netlist". Since the graphical elements can also be represented as sets of x,y coordinates, the entire presentation network topology can be stored as ASCII text in human-readable files, if so desired.

In a preferred embodiment, the presentation network topology is hierarchical. The top level of the hierarchy is represented by the trunk nodes along the primary path. The next level down contains first order branch nodes located near the beginning of each secondary path. The next level down contains second order branch nodes, and so on down through layers to the lowest level that contains the leaf nodes. Since the actual physical address of the original source data items is stored along with the data item for each node in the tree, new synthetic networks can be created that are continuations of any previous network by performing a new transform on the source database beginning at that node.

The preferred presentation network topology performs several useful functions. First, it serves as a set of "rails" that the playback engine can traverse during the presentation or playback step as discussed infra. Second, it serves to preserve much of the original connectivity information that was present in the data pointers of the source database before transformation, such that traversal along a secondary path from the primary path represents a seamless and natural transition. Third, it provides an implied time axis for the adaptive and seamless playback, wherein an illusion of virtual motion in "dataspace" is experienced by the user.

The preferred presentation network topology may be variable in size, aspect ratio, complexity, and extent. Each of these variables can be set by the user. Size refers to the total quantity of data that is contained in, or pointed to by, the nodes of the presentation network topology. The presentation network topology is defined at least in part by a tree depth corresponding to the number of trunk nodes placed in series, and a tree width corresponding to an average number of branch nodes and leaf nodes originating at each trunk node. The aspect ratio corresponds to the tree depth divided by the tree width. Complexity refers to how many dimensions, or branches, radiate from each node in the tree. Extent refers to the total number of nodes in the tree.

While there are no theoretical limits to any of the above variables, there are obvious practical considerations that pertain to storage limitations, display limitations and computational time. Similarly, there is no requirement that structures be symmetrical, though for ease of conceptualization, symmetrical trees are preferred.

According to a preferred embodiment, the presentation network may be edited by the user before or after the database presentation step. In particular, the user is permitted to delete nodes in a graphic representation of the presentation network topology. Responsive to this deletion, the presentation network is rebuilt to establish links where nodes have been deleted. This feature may be especially useful when the user plans to build on the presentation network topology in a future session, and wants to free up local storage resources, such as disk space, by eliminating useless or less interesting branches before adding onto the presentation network.

FIG. 2A further shows (step 210) the step of presenting the subset of data items chosen at step 206 according to the presentation network topology developed at step 208 and according to playback commands, if any, issued by the user Step 210 is now described in general terms. The presentation is based on an adaptive algorithm that determines both what will be displayed next, and when it will be displayed. In this manner, the user is permitted to be as active or as passive as desired during the playback of data items. In particular, when the user is active, decisions for traversing the primary and secondary paths are left to the user. If the user chooses to remain passive, that is, issues "null commands," the playback of data items becomes automated according to a set of adaptive rules. This allows the seamless presentation of data items to be even further enhanced.

A preferred presentation step may include several features for further enhancing the seamless presentation of data items. A first such feature is dynamic path selection. During playback, data items corresponding to nodes in the presentation network are presented serially, in an order which corresponds to a path among nodes in the presentation network. When a data item corresponding to a node is being presented to the user, the user is considered to be "at that node" in the presentation network. The path may start anywhere in the network, though the default is the first trunk node, also called the start node of the presentation network. The actual path or vector the user follows through the network is dynamically determined, assuming the user provides some direction. Preferably, the user's selection of the path vector is made with one key, or button, by responding to the alternating branch choices visually presented, or presented by audition, in the case of an audio database, at trunk nodes and branch nodes. The next data item is then immediately presented, without an interruption in the display or audio output. Should the user fail to make a selection, playback is continued along a default path, without interruption, after a predetermined number of alternating choice presentations.

Another set of features in the preferred embodiment is adaptive automation, autoplay and adaptive transformation. In this embodiment, the user is assigned a profile that contains the user's selection parameters. When data items are analyzed (step 206), a quality metric is assigned to each data item, the quality metric being a vector containing elements representing the quality of match between each of the selection criteria and the content of that data item. It is to be noted that the quality of the match may be determined in any of several ways, ranging anywhere from simple word count matching to complex analysis, such as image recognition and audio clip recognition of data item content.

Every time the user makes a selection, thus determining the current path or vector, the user's profile is updated to reflect the state of the match between the present node's quality metric and the user's profile. For example, the user's selection parameters may have initially specified three search terms such as "water", "sand", and "sun". If the user continues to select data items having "sand", the user's profile will end up being modified to reflect that the user considers "sand" to be a more important desired element in relation to "water" or "sun". In this way, the playback algorithm adaptively "learns" about the user's preferences.

If, after a period of affirmatively guiding playback by means of affirmative playback commands, the user ceases to make selections, playback may be continued automatically utilizing those stored preferences. In effect, the playback algorithm acts on behalf of the user, as adapted from the history of the user's path through the presentation network. Either the adapted user profile, or the initial user profile, may be selected to play back a database path automatically, without user intervention. This mode of operation is called autoplay.

In the preferred embodiment, a history of all user preferences and selections may be maintained since the time of program initialization. This may include several days, weeks, or months of historical user data. This user history may be used by the database transform process to set the selection criteria and filters for creation of a new output database to be made from any source database. The new output database can be grafted onto the existing presentation network topology, or a new presentation network topology can be created. If "learned" criteria are used to drive the database transformation, the transformation itself can then be considered "adaptive" with respect to the user's history of preferences.

Another feature in the preferred embodiment is variable playback resolution. As discussed previously, at each node a data item corresponding to that node is "held" in front of the user, i.e. presented to the user, for a hold time. After this, data items corresponding to the next allowable nodes (e.g., A and B) in the presentation network are presented to the user, and in particular are successively "flipped" in front of the user for a flip time (A, B, A, B, etc.) until the user makes a choice. According to a preferred embodiment, the hold time and flip time may be varied by the user for controlling the overall speed of playback. When the hold and flip times are large, a slow and thorough serial presentation of the data items is enabled. In contrast, when the hold and flip times are set very low, a fast-forwarding effect results. This provides the user with a kind of skimming, low-resolution view of the paths.

Yet another feature of a preferred embodiment is hierarchical playback. If the user does not select autoplay mode and never makes a branch choice, playback proceeds by default along the primary path, from trunk node to trunk node. Since trunk nodes represent the main "stems" of the n-dimensional tree, the user will only see data pages along those main, top-level paths. If the user makes only one branch choice per trunk node, only the first branch node of the secondary paths originating at each trunk node is displayed, thus providing a view of the data along only the first layer of branches in the tree. Likewise, if the user makes two branch choices per trunk node, a view of data along both the first and second layers of the tree is provided.

Importantly, according to a preferred embodiment, nodes pointing to data items having a high degree of correlation with the search parameters are placed closer to the primary path, whereas nodes pointing to data items having a lesser degree of correlation with the search parameters are placed farther from the primary path. As such, by making fewer choices per trunk node, more pertinent data items may be viewed, whereas by making more choices per trunk node, the user may view those data items that are less pertinent to the search parameters. In this manner, hierarchical playback is enabled, wherein the user is capable of selecting paths down to a desired level of interest in the presentation network.

An example of one application of the preferred embodiment of FIG. 2A is briefly presented here. Specifically, the source database for the method of FIG. 2A may be a video presentation of a sporting event, such as a hockey game. In this case, the source database is a single flat file such as a AVI file storing the entire video presentation of the event. Especially with respect to events of longer duration having relatively brief and sparse moments of excitement, such as hockey games, it may be desirable to avoid the sequential, linear playback of the entire video file (the source database) and provide a more brief and entertaining form of playback to the user.

Accordingly, the hockey game can first be recorded and stored in a source database comprising the video file. The video file is then processed into a second database comprising the preferred presentation network. It is then possible to "play" the transformed hockey game back to a user in a fraction of the time that it would otherwise take for the user to experience the game, while adding entertainment value as well. In this example, search filters could be formed for extracting goals, penalties, and fights from the source database. These filters may be implemented using any of a variety of technologies such as speech recognition, image recognition, or other technologies that are beyond the scope of the present disclosure. These filters could be used to search the flat file source database for creating a presentation network of:

* Goals represented near trunk nodes; and
* Penalties and fights between the goals represented near the branch nodes and leaf nodes.

By using a time window around each of the items of interest, pages of interest can be created. Optionally, additional information from network or league data bases (statistics) can be interleaved with this data (gathered from other data bases). In the step of playing back the presentation network, the user may then quickly move down the trunk to the goal of interest, view (or listen to) the action leading up to the goal and following the goal, and then either go on to the next goal on the trunk or view the fights and penalties that preceded that goal. Thus, whereas the source hockey game may have been three hours, the user is capable of taking an entertaining "ride" through the hockey game, in an order individually selected and driven, in a brief period of time such as fifteen minutes.

Although the above example is an entertainment-oriented example for a single event, other applications may include league officials evaluating referees or teams evaluating players. Additionally, fans may view games from different points of view, such as by following a single player instead of the game, wherein the significant activities of that player correspond to the trunk nodes in the presentation network. This is particularly interesting to those fans who play well-known "Fantasy football" type of games, who need to see how their players are doing but would have to sift through many hours of linear video or radio playback to find this information.

For completeness of disclosure, and not by way of limitation, a description of an a further example of a preferred embodiment is set forth below. In particular, a method and apparatus for seamless network browsing is described. It is advantageously applied to a large, distributed, hierarchical source database such as the database comprising the World Wide Web (WWW) pages connected to the Internet. It is to be appreciated, however, that this method may be advantageously applied to any of a variety of source databases, including, for example: criminal records databases, motor vehicles databases, real estate databases, or music databases.

With reference to FIG. 2A, the transformation step 206 according to a preferred embodiment includes the downloading of the selected data items from remote database nodes to the user's local hard drive. The presentation step 210 includes the step of playing back the selected database items according to the presentation network synthesized at step 208, wherein in addition to seamless browsing, very fast data access times are enabled by the presence of the data items on the user's local hard drive.

Figure 2B:
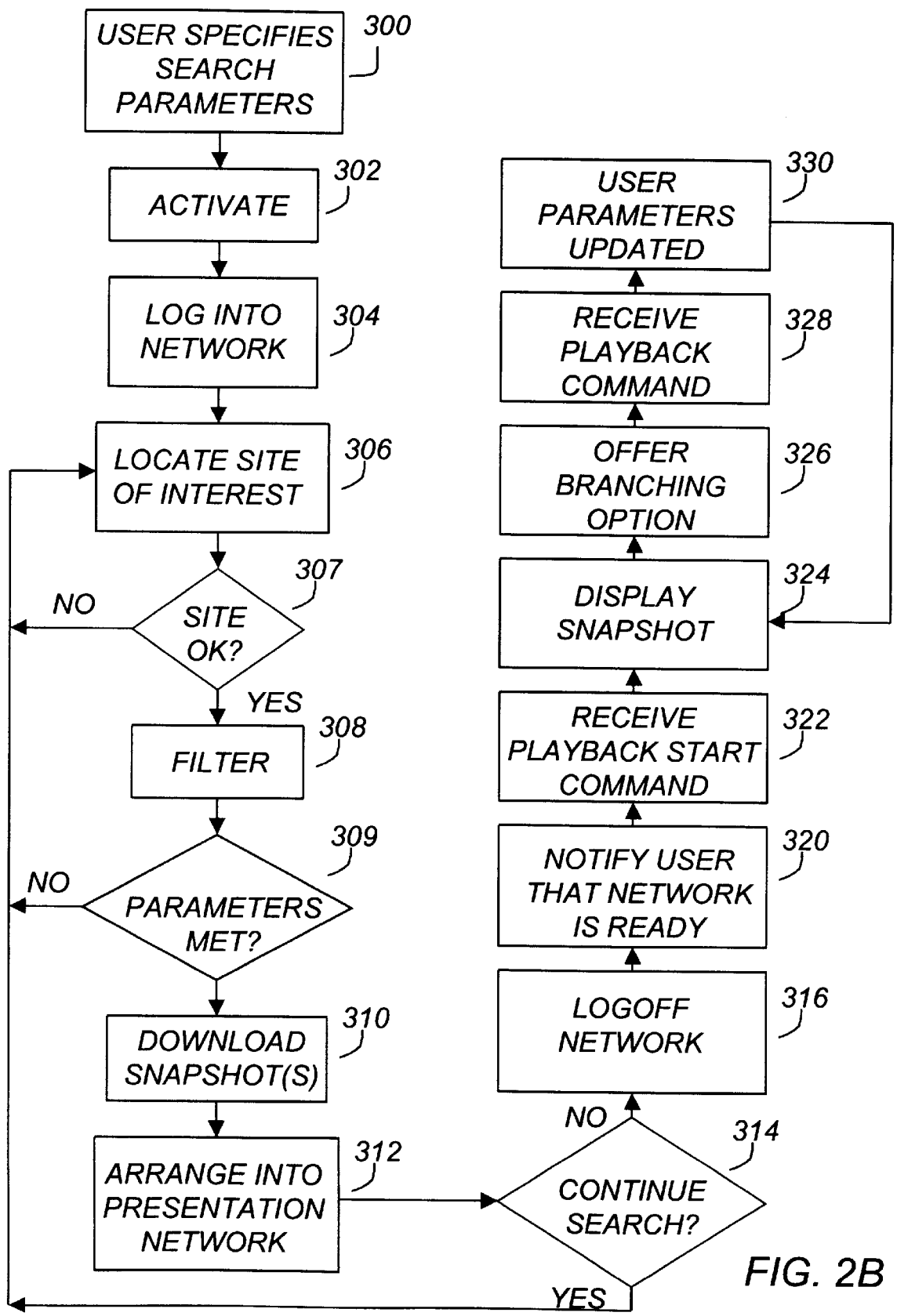
FIG. 2B is a flow chart illustrating the steps of a method for seamless network browsing according to another preferred embodiment.

FIG. 2B is a flow chart illustrating the steps of a method for seamless network browsing performed by the computer 100 in accordance with a preferred embodiment. Computer 100 receives (step 300) search criteria that are to be used, in particular specific keywords that are expected to appear in information that is of interest. It is to be appreciated that the keywords do not necessarily need to correspond to desired text items, but may be any data item characteristic such as the desired color of a photograph of an automobile, or the desired audio frequencies present in an audio clip, or the desired action sequence (e.g., plane crash) of a video clip. Information to be retrieved from information sources on the WWW is ranked for presentation to the user, based on the cumulative weight of the keywords located in the information. As discussed below, the keyword weights are updated during playback in order to reflect the user's actual chosen preferences.

Computer 100 is activated (step 302) when the resultant use of computer 100 will not interfere with other activities of the user, or when the user intentionally activates the computer program containing an embodiment. Once activated, the computer 100 logs into the network (step 304). Once connected (step 306) an information source is located that may contain information meeting the search parameters. For purposes of locating an information source where the source database comprises nodes connected to the WWW portion of the Internet, computer 100 may use any of a variety of well-known search engines. One skilled in the art will recognize, however, that other location methods such as the use of preformed hot lists or Internet search agents may be used without departing from the scope of the present invention.

The selected information source is searched (step 308) for data items corresponding to the search parameters. If the source database comprises nodes connected to the WWW portion of the Internet, computer 100 may search the text contained within WWW pages, as well as the text of the filenames of WWW pages, for text matching user-specified keywords in the search parameters. Computer 100 then determines (step 309) whether matching text was found, or whether the weights associated with the text exceeded a specified threshold value. If yes, computer 100 proceeds to step 310. Otherwise, it abandons that information source and returns to step 306 for proceeding to the next information source.

Computer 100 downloads (step 310) as data items from the information source as are necessary to retrieve the corresponding information. For purposes of the present embodiment, these data items may be referred to as snapshots of data. If the source database comprises nodes connected to the WWW portion of the Internet, a snapshot generally comprises an image of a WWW page. A snapshot may contain all of the data from the page or merely a subset of the data. An illustrative example of a subset would be one picture on a WWW page in JPEG or GIF format, along with any accompanying text describing the contents of the picture. In step 310, snapshots are downloaded by storing them on storage media, such as the hard disk drive 110 associated with computer 100. In general, it is to be appreciated that a snapshot may consist of any type of data that is storable in digital form, including audio clips, video clips, computer programs, movie scripts, or other information.

After the snapshots are downloaded, they are arranged (step 312) into a presentation network according to a presentation network topology similar to that described in relation to step 208 of FIG. 2A supra. The presentation network is formed in anticipation of the playback stage, during which snapshots are presented to the user in an interactive, serial, and seamless manner.

After step 312, computer 100 determines (step 314) whether or not to continue to locate additional information meeting the search parameters. The program will either (a) return to step 306 if additional information sources remain to be searched and no retrieval limitations, as discussed below in conjunction with the User Interface module, have been reached, or (b) log off the network (step 316) if retrieval limitations have been met or all candidate information sources have been searched.

After the step of logging off is performed, the user is notified (step 320) that the presentation network is ready for playback. A playback start command is received from the user (step 322), wherein playback begins (step 324). Importantly, it is noted that step 322 may be executed at a time that is far removed from the time of execution of step 320. Additionally, step 302 may be executed at a time that is far removed from the time of execution of step 300. In one preferred embodiment in which the source database comprises nodes connected to the WWW portion of the Internet, a timer such as a Windows 95®-interactive timer is provided to cause the activation of step 302 during off-peak hours, such as the early morning hours, when traffic on the Internet is reduced and telephone access rates are less expensive. After completion of step 316, the user may activate the program on the following day or a subsequent day for experiencing an interactive, seamless presentation of snapshots without the waiting times associated with the WWW portion of the Internet.

Once initiated, playback may be interactive with the user or controlled by the computer 100. A snapshot is presented (step 324) to the user, usually by visual presentation on monitor 102. After an appropriate viewing duration defined by a user-selectable hold time, the user is offered (step 326) a plurality of next snapshots to choose from, the next snapshots corresponding to nodes pointed to by the present node in the presentation network topology. In one preferred embodiment, for example, two next snapshots are displayed alternately on monitor 102. If the user desires, the user may issue an affirmative playback command during the interval for which the desired next snapshot is displayed. If the user chooses not to issue a command, i.e. issues a null command, the computer 100 will control the playback and choose the next snapshot to be displayed, according to the presentation network topology and according to previous playback commands entered by the user.

When the user chooses at step 328 which snapshot to view next, user preferences and search parameters are updated (step 330) to reflect the search parameters (e.g. keywords) the user now favors. This updated data will allow the computer 100 to choose an appropriate playback through the downloaded snapshots corresponding to the presentation network topology. After user parameters and search parameters are updated (step 330), the step 324 is repeated.

Figure 3:
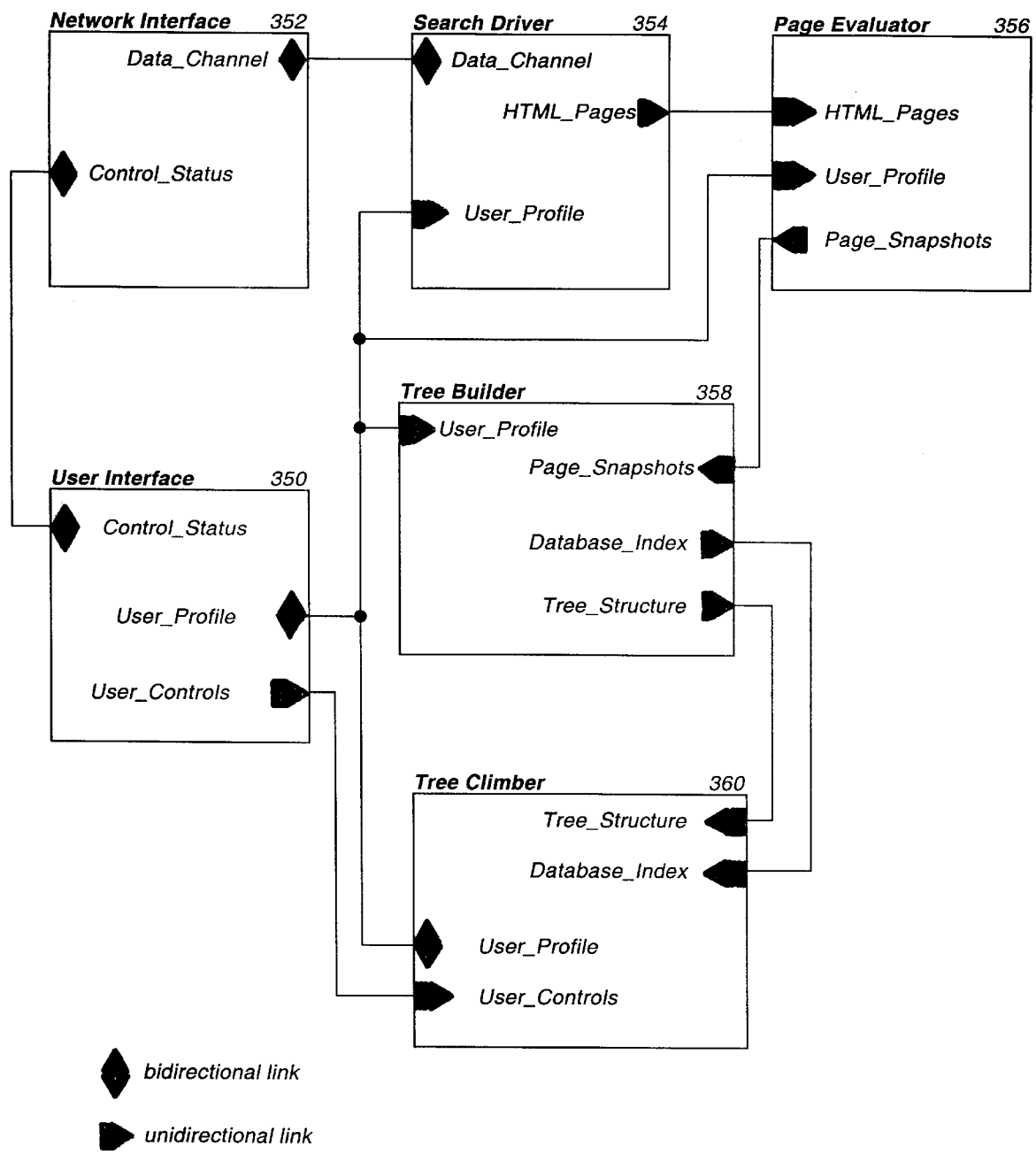
FIG. 3 is a conceptual block diagram of modules of a computer program used by a computer in performing steps in accordance with the preferred embodiment of FIG. 2B.

FIG. 3 is a conceptual block diagram of modules of a computer program used in a computer program for instructing the computer 100 to perform steps in accordance with the present embodiment. The computer program comprises User Interface module 350, a Network Interface module 352, a Search Driver module 354, a Page Evaluator module 356, a Tree Builder module 358, and a Tree Climber module 360. FIG. 3 shows conceptual links between the modules, including bidirectional links and unidirectional links for sharing data or otherwise communicating, as is readily interpreted by a person of ordinary skill in the art.

User Interface module 350 accepts search parameters and user preferences from the user and, during playback, accepts user page selections and other commands. Network Interface module 352 makes the connection to a network and maintains a bidirectional data channel. Search Driver module 354 activates a web browser, selects a search engine if one is to be used, initiates the user's search request, and locates information sources of interest. Page Evaluator module 356 evaluates information found in the information sources in order to find the best matches with the user's search parameters, and formats snapshots for storage by the Tree Builder module 358. Tree Builder module 358 constructs the presentation network according to the presentation network topology. Snapshots that have been formatted by the Page Evaluator module 356 are stored by the Tree Builder module 358 into a presentation network according to a presentation network topology that may be graphically represented as a tree. In one preferred embodiment, all snapshots are stored in a snapshot file on computer 100, and are pointed to by each node in the presentation network topology associated with the presentation of that snapshot. Finally, Tree Climber module 360 manages the playback according to the presentation network topology and the playback commands, if any, issued by the user.

Figures 2, 4:
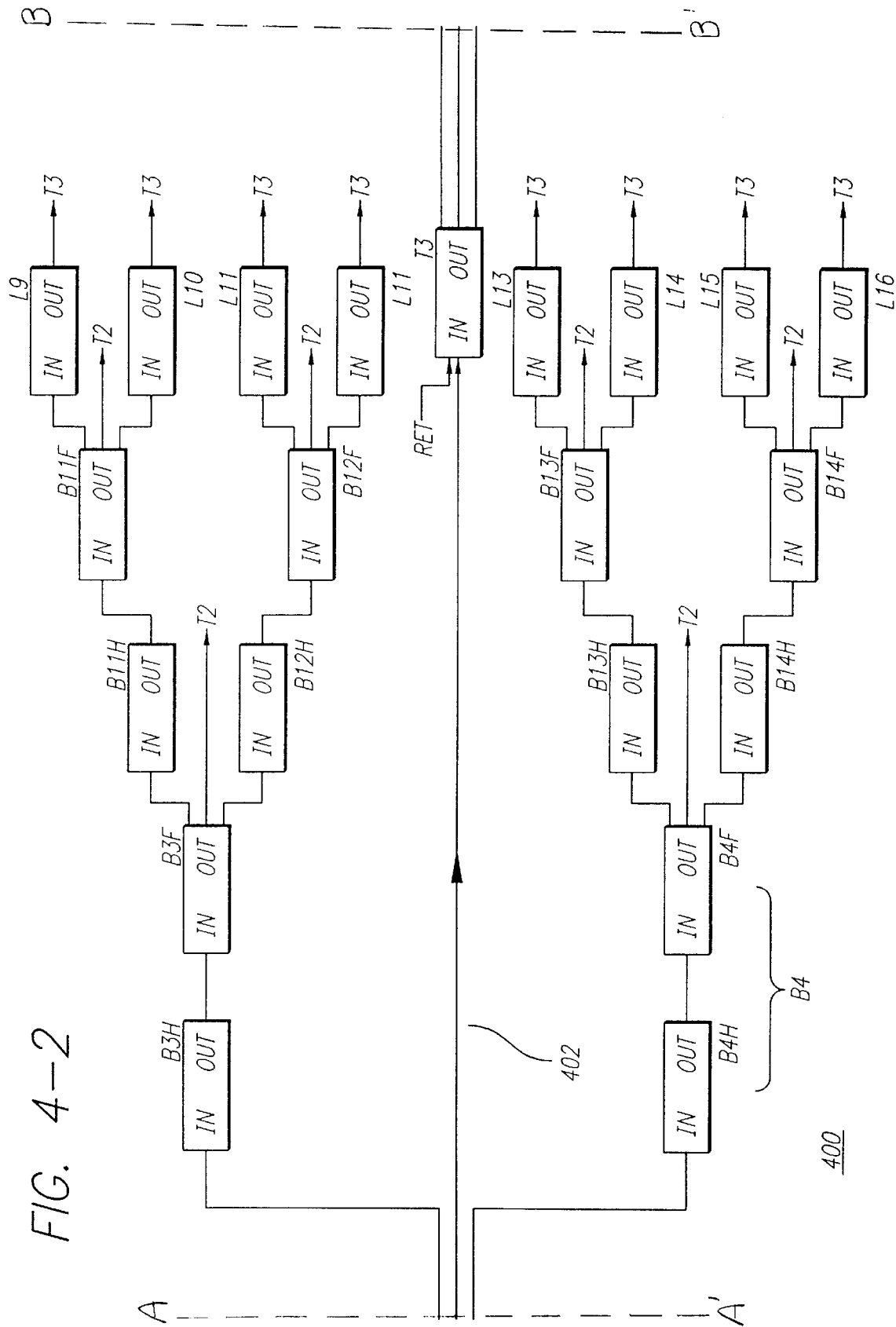
FIG. 4 is a graphical representation of a sample presentation network topology according to a preferred embodiment.
Figures 3, 4:
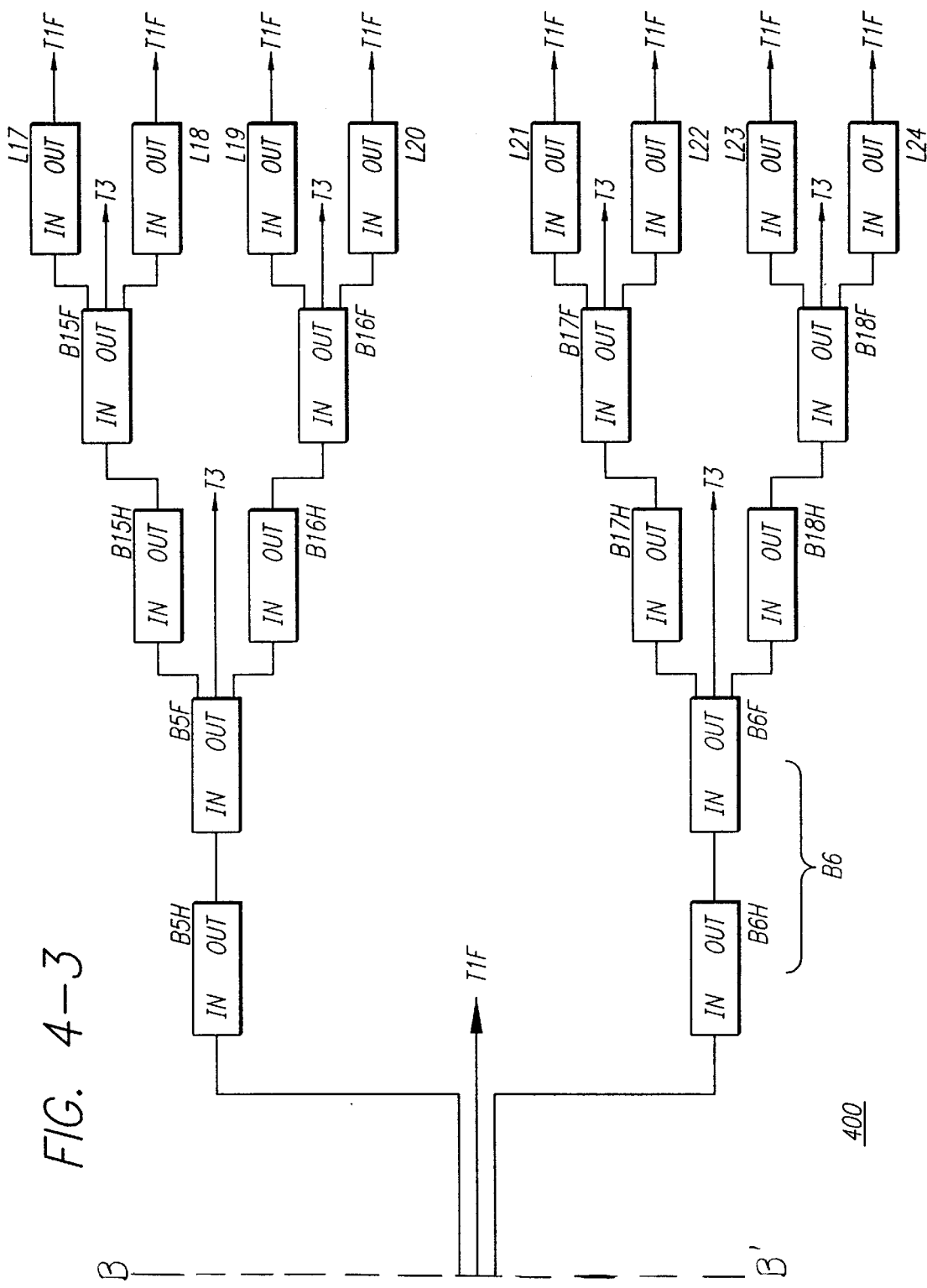

FIG. 4 is an exemplary presentation network 400 generated by Tree Builder module 358. Presentation network 400 comprises trunk nodes T1–T3, branch nodes B1–B18, and leaf nodes L1–L24. Trunk nodes T1, T2, and T3 are coupled along a primary path 402, and therefore the presentation network 400 has a depth of three. Trunk nodes T1, T2, and T3 each spawn secondary paths through three layers of branch and leaf nodes, and therefore the presentation network 400 has a width of three. The presentation network 400 thus has an aspect ratio of 1, and further has an extent of 45, which corresponds to the number of nodes, and a complexity of two, which corresponds to the number of branch nodes coupled to each trunk node. Finally, by way of example, if each node had an exemplary data storage requirement of 25 kB for storing its related snapshot, the presentation network 400 would have a size of roughly 1.05 MB.

Each of trunk nodes T1–T3 comprises a first entry identifier, return entry identifier, first and second exit pointers pointing to branch nodes on opposite sides of the tree of FIG. 4 and a default exit pointer. The first entry identifier of trunk nodes T2 and T3 is pointed to by the default exit pointer of the preceding trunk node, while the first entry identifier of trunk node T1 corresponds to the start of the playback process. As drawn in FIG. 4, an entry identifier of a node is "pointed to" by an exit pointer of another node if there is a line drawn between the first "IN" label of that node and an "OUT" label of the other node. The default exit pointer of trunk node T3 points to the return entry identifier of trunk node T1.

Presentation network 400 further comprises first order branch nodes B1–B6 pointed to and pointing as shown in FIG. 4. Each branch node in FIG. 4 is drawn as two subnodes in FIG. 4, the first subnode being a hold node corresponding to that node's snapshot presentation, and the second subnode being a flip node for successively flipping the candidate next snapshots during the flip time. For example, branch node B1 comprises a hold subnode B1H and a flip subnode B1F. Without loss of generality, the subnodes B1H and B1F are collectively referred to herein as branch node B1, and likewise for branch nodes B2–B18. Branch nodes B1–B6 are first order branch nodes in that they are only one level removed from the primary path 402. Presentation network 400 further comprises second order branch nodes B7–B18 coupled as shown in FIG. 4, each of the second order branch nodes being two levels removed from the primary path 402. Finally, presentation network 400 comprises leaf nodes L1–L24 coupled as shown in FIG. 4, the leaf nodes L1–L24 being three levels removed from the primary path 402.

In accordance with the present embodiment, each branch node comprises first and second exit pointers pointing to either a lower order branch node or a leaf node. Each branch node is pointed to by the first or second exit pointer of a trunk node or a higher order branch node. Finally, each branch node comprises a default exit pointer pointing to the return entry identifier of the previously encountered trunk node. For example, branch nodes B3 and B11 each have default pointers pointing to the return entry identifier of trunk node T2.

In accordance with the preferred embodiment, each leaf node terminates a secondary path and is pointed to by the adjacent lowest order branch node on that secondary path. Each leaf node has a single exit pointer which points to the return entry identifier of the next trunk node. For example, leaf node L9 has an exit pointer pointing to the trunk node T3. In the case of the leaf nodes on the final trunk node, the exit pointer points to the return entry identifier of trunk node T1.

In the above manner, a seamless, interactive serial presentation of the snapshots corresponding to the nodes of presentation network 400 is enabled. Table 1 lists, by way of nonlimiting example, a typical playback experience enabled by the presentation network 400.

TABLE 1

Sample Playback Scenario for Presentation Network 400

| Nth Node Traversed | Node | Playback Command | Next Node |
|---|---|---|---|
| 0 | T1 | second | B2 |
| 1 | B2 | first | B9 |
| 2 | B9 | first | L5 |
| 3 | L5 | (not applicable) | T2 |
| 4 | T2 | first | B3 |
| 5 | B3 | -NULL- | T2 |
| 6 | T2 | second | B4 |
| 7 | B4 | first | B13 |
| 8 | B13 | -NULL- | T2 |
| 9 | T2 | second | B4 |
| 10 | B4 | second | B14 |
| 11 | B14 | first | L15 |
| 12 | L15 | (not applicable) | T3 |
| 13 | T3 | -NULL- | T1 |
| 14 | T1 | -NULL- | T2 |
| 15 | T2 | -NULL- | T3 |
| 16 | T3 | first | B5 |
| 17 | B5 | second | B16 |
| 18 | B16 | . . . | . . . |

According to the preferred embodiment, a treelist may be created for depicting the presentation network 400. The treelist is a structured list that defines the connectivity among elements of the tree. Furthermore information relating to the origin of retrieved information may optionally be maintained on the local disk drive 110, such that the user may rapidly connect to the specific network information source that supplied any given snapshot.

User-controllable parameters are set according to the preferred embodiment to affect the size of the database tree. One such parameter is the maximum snapshot size, representing the maximum amount of data that can be saved in one snapshot in the snapshot file. Another parameter, disk allocation, represents the maximum amount of storage space on computer 100 that may be consumed in constructing the database tree. A limit may also be placed on network connection time, which will restrict the amount of time that the Search Driver module 354 may expend in locating and retrieving data from the network. Finally, the amount of data that the Search Driver module 354 can retrieve per unit of connect time may also be specified.

Advantageously, the present invention provides to the user a graphical depiction of the presentation network as shown in FIG. 4 to allow the user to view the effect of altered keyword weights or changes in the aspect ratio. Also, if playback is interrupted by the user, the graphical representation may be employed to show the user's current position in the network, which can be saved as the initiation point for a future playback.

User Interface module 350 is now described. User Interface module 350 allows the user to specify preferences, that are saved in a user profile stored on computer 100. These preferences include selecting background or foreground operation of the information search and retrieval functions, selecting the window size of the monitor in which to display the playback, identifying a printer, etc. When the user is viewing a playback, the User Interface module accepts input from the user to make selections between snapshots at trunk nodes and branch nodes. The user can also interrupt the playback during the display of any snapshot and, while playback is interrupted, print or copy the snapshot.

User Interface module 350 has two basic tasks: providing the user a means to configure the software prior to starting up the main functional parts of the system, and providing a means of control during main operations. The User Interface provided by the User Interface module 350 should preferably be as easy to use as, for example, a user-friendly video cassette recorder (VCR). Since the User Interface contains default settings for all configuration parameters and default filter parameters for database processing, the setup task may be safely ignored and never seen by the user, if so desired. For software systems embedded in consumer appliances, the configuration task can be reduced to operations similar to those of a VCR that utilizes on-screen menus. Control methods during main operations may be modeled on those of a VCR or remote-controlled CD player.

Figure 5:
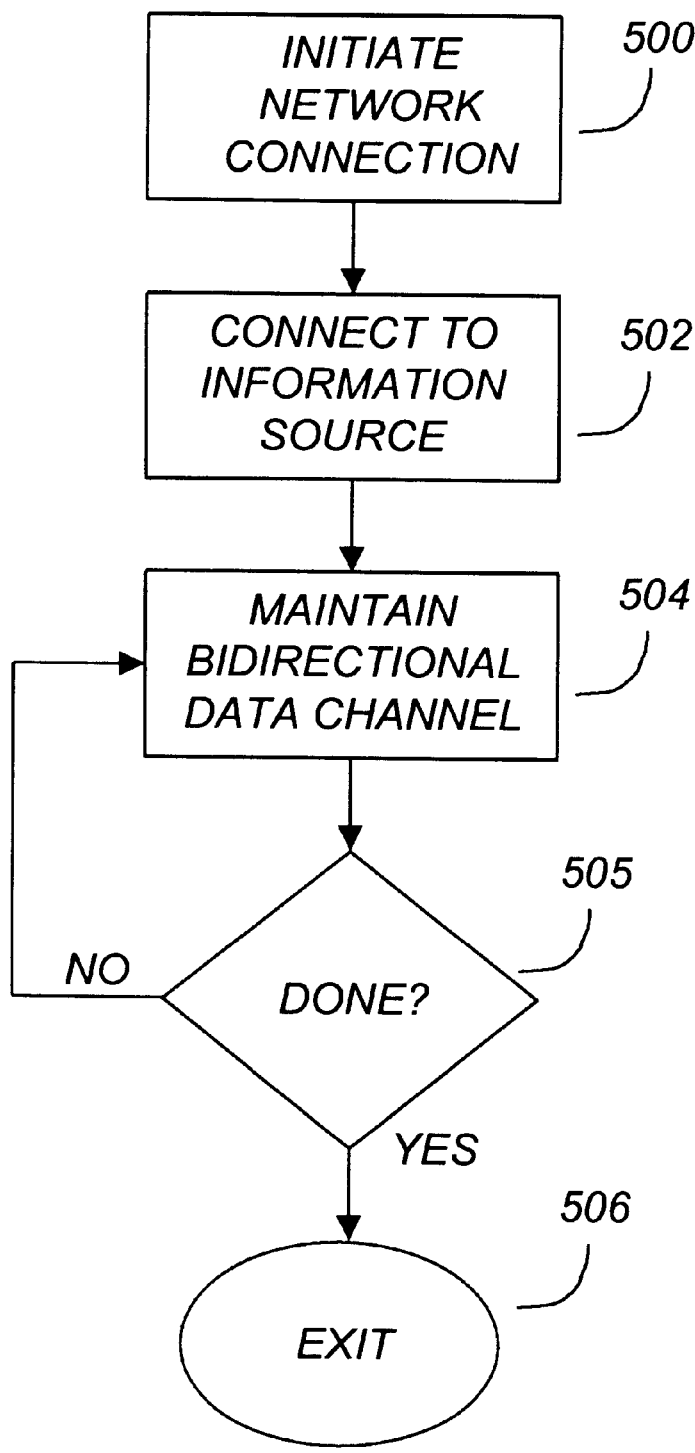
FIG. 5 is a flow chart illustrating steps taken by a Network Interface module of FIG. 3.

Network Interface module 352 is now described. Network Interface module 352 may comprise any of a variety of network interface programs already known in the art. Network Interface module 352 supports any type of network connection that is installed on computer 100. The module can be configured to use any network access provider and web browser available on computer 100 or, alternatively, employ network access and web browser components included with this invention. FIG. 5 shows the method of operation, already known in the art, of Network Interface module 352. A network connection is initiated (step 500) as either a foreground or background operation on computer 100. The module then connects (step 502) to an information source 106 on the network. Once this connection is established, the Network Interface module 352 receives (step 504) snapshot data for storage on computer 100. When the playback database is complete, or retrieval limitations have been reached, and the Search Driver module 354 has exited, the Network Interface also exits (step 506).

Search Driver module 354 is now described. If the source database comprises a set of database nodes connected to the WWW portion of the Internet, the Search Driver module 354 operates a web browser program and any search engines or agents that will operate under, or in conjunction with, the browser. Once connected to the network via the Network Interface module 352, the Search Driver module 354 will select a search engine and instruct it to begin locating web pages that match the keywords in the user profile that was created in the User Interface module 350. Based on the user profile created by the User Interface module 350 and feedback from the Tree Builder module 358 (discussed below), the Search Driver module 354 monitors the construction of the snapshot database and halts its operations when limitations have been met. The Search Driver module 354 will first locate web sites suitable to act as trunk nodes for the tree. Next, sites are located to fill the branch nodes and leaf nodes. After all nodes of the database tree have been filled, the Search Driver module 354 commands the Network Interface module 352 to disconnect from the Internet.

Figure 6:
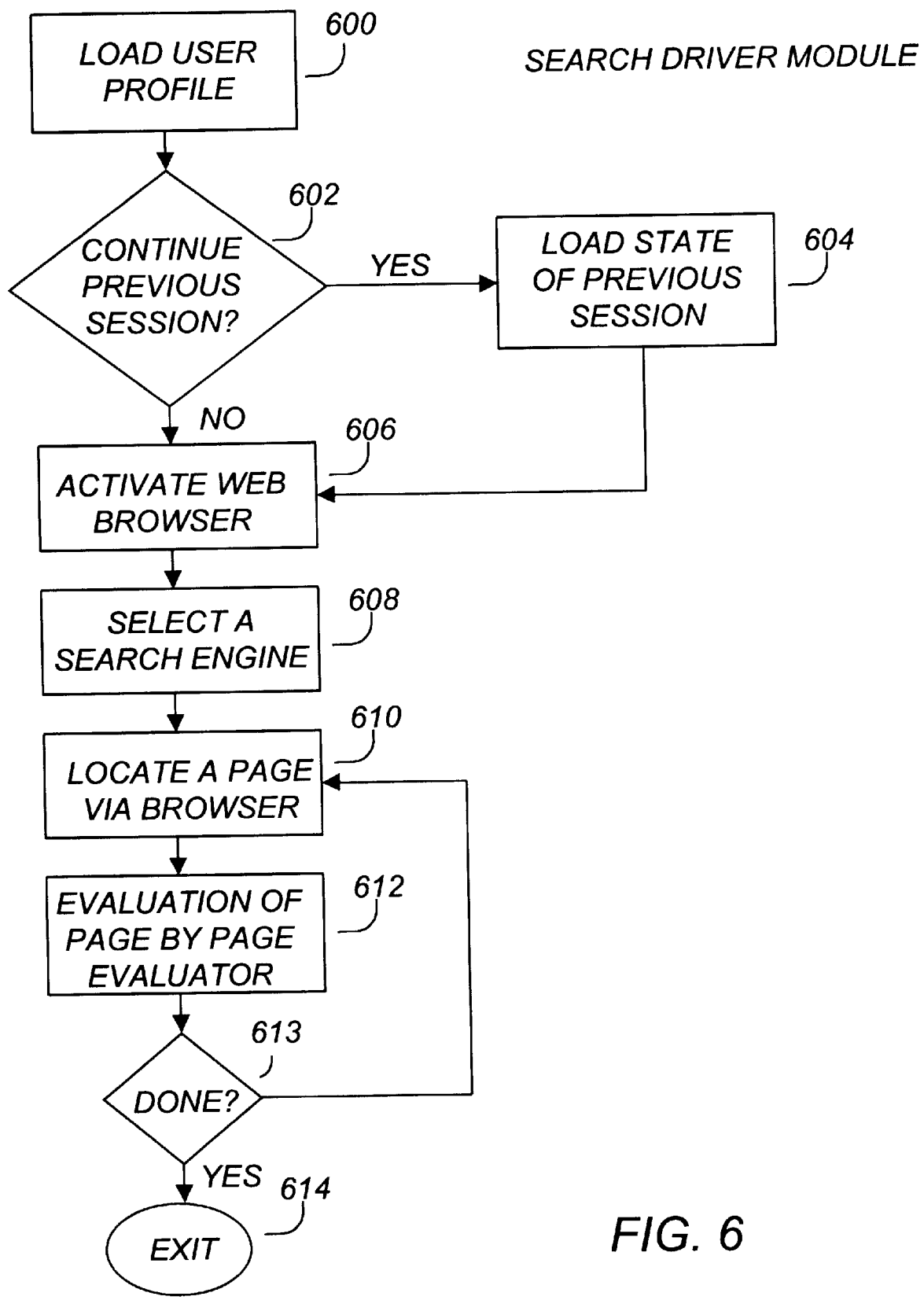
FIG. 6 is a flow chart illustrating steps taken by a Search Driver module of FIG. 3.

FIG. 6 shows a flowchart corresponding to steps taken by Search Driver module 354. The user's preferences are loaded from the user profile (step 600). The Search Driver module 354 then determines (step 602) whether the user is continuing a previous session or starting anew. If continuing, the last saved state of the previous session is loaded (step 604). After the Tree Builder module 358 constructs an empty tree (see below) the Search Driver module 354 activates a web browser (step 606) and selects a search engine (step 608). In an iterative loop, a web page is located (step 610) and passed off (step 612) to the Page Evaluator module 356 to determine if it is suitable for inclusion in the tree. Optionally, the search driver module 354 may be programmable with respect to a minimum acceptable download rate or a maximum acceptable response time of a database server. For example, if the server containing the web page located at step 610 is downloading information to the computer 100 at a rate slower than the minimum acceptable download rate, or if the server containing the web page takes a longer time to respond than the maximum acceptable response time, transactions with that web page may be immediately cancelled and a the search driver module 354 may immediately proceed to another web page on a different server. When notified by the Tree Builder module 358 that the tree is fully populated, the Search Driver module 354 exits (step 614).

Page Evaluator module 356 is now described. The Page Evaluator module 356 receives web page data from the Search Driver module 354 and evaluates the data on the basis of user preferences. When the data and search parameters (i.e. keywords) are of a suitable match, the Page Evaluator module 356 constructs a formatted snapshot to pass to the Tree Builder module 358 for inclusion in the snapshot database. Thus it should be apparent that the invention retrieves and presents only the information that best matches the user's demands. The Page Evaluator module 356, when rejecting a web page, will note the page's network location in a log file. By doing so, the invention can present the user with the option of expanding the scope of the original search parameters (i.e. keywords) and user parameters. The user may at some point desire to look at other information that would be captured as a result of a keyword or parameter change. By referencing entries in the log file that meet the expanded parameter or re-weighted keyword, the invention will connect to the corresponding information sources 106.

Figure 7:
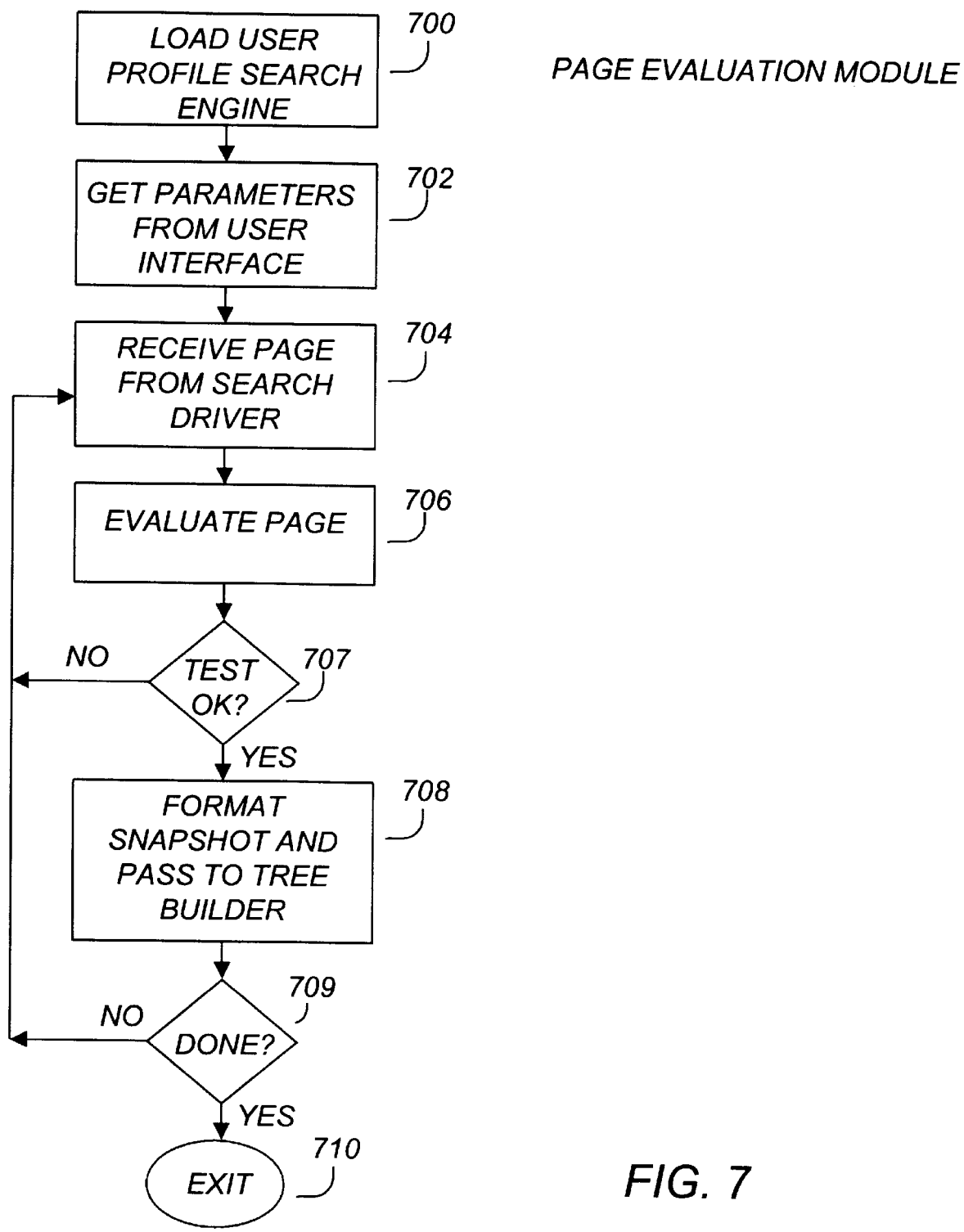
FIG. 7 is a flow chart illustrating steps taken by a Page Evaluator module of FIG. 3.

Referring now to FIG. 7, a method of operating a Page Evaluator module 356 is disclosed. When activated, the Page Evaluator module 356 first loads the user profile (step 700). Snapshot limitations are then set (step 702). Illustrative limitations include a maximum snapshot size and the portion of the maximum snapshot size that can be filled with, for example, image data, text data, etc. Next (step 704) the Page Evaluator module 356 repeatedly obtains a page from the Search Driver module 354, evaluates it (step 706), and, if it is suitable for inclusion in the database, submits it to Tree Builder 358 (step 708). When a page is evaluated, it may be rejected for a variety of reasons. For example, it may be larger than the maximum snapshot size, or, when matched against the user's keywords it may produce too low a score. Also, there may be no graphic images associated with the page, making it thereby unsuitable for inclusion in a web playback. If the approved snapshot does not fill the allocated space, the Page Evaluator module 356 will attempt to find another qualified snapshot that will fit into the remaining space. If such a snapshot is found, this module will assemble them together in a vertically scrollable form before passing them to the Tree Builder module 358.

Tree Builder module 358 is now described. The Tree Builder module 358 constructs the presentation network according to the tree-like presentation network topology as illustrated at FIG. 4. This module receives snapshots from the Page Evaluator module 356 and the user profile from the User Interface module 350. The Tree Builder module 358 operates first to construct an empty tree. Based on the parameters specified by the user, as discussed above in conjunction with the User Interface module 350, an empty tree is constructed, after which the tree is populated.

Figure 8:
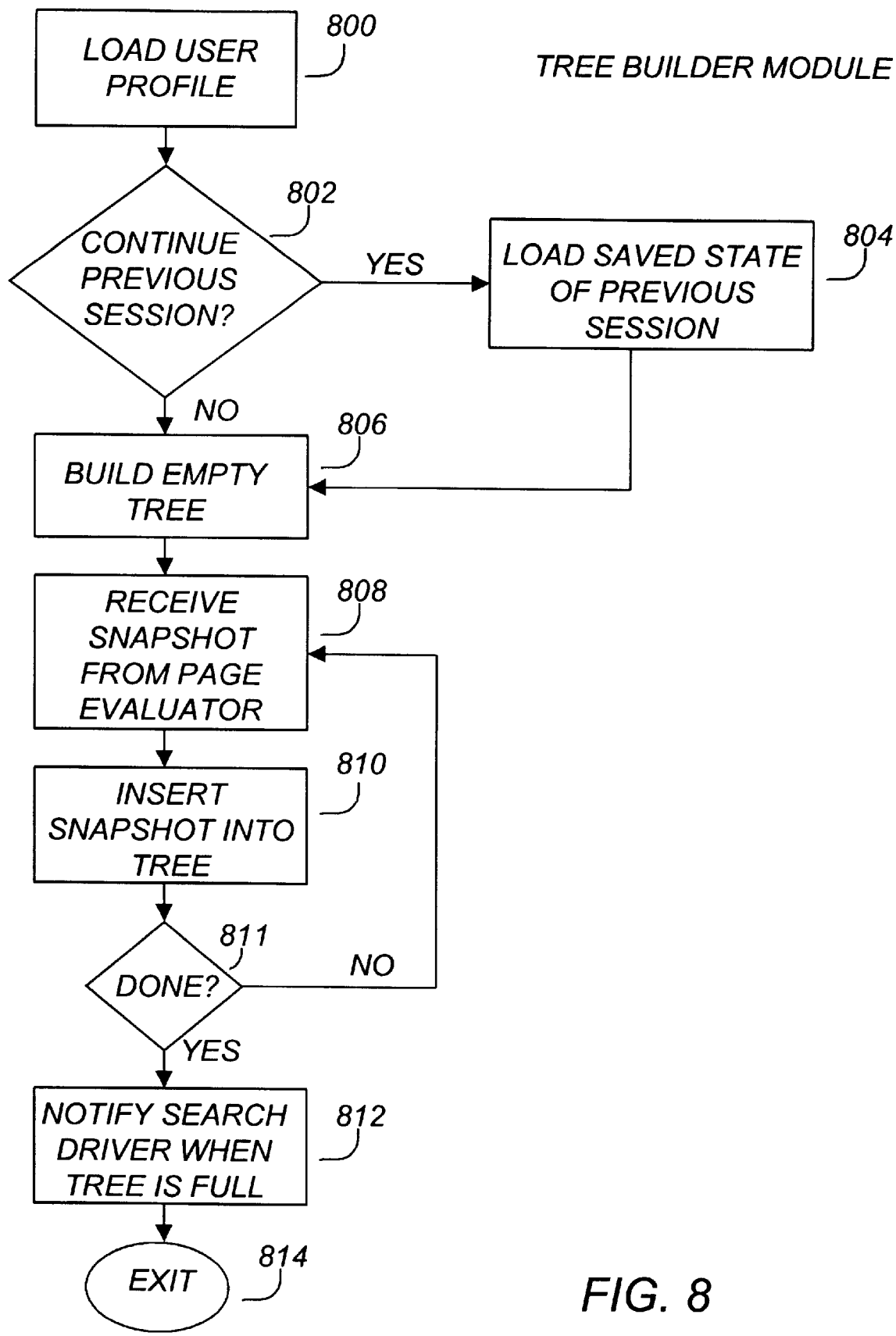
FIG. 8 is a flow chart illustrating steps taken by a Tree Builder module of FIG. 3.

Referring now to FIG. 8, a method of operating a Tree Builder module 358 is disclosed. As a first step, the user profile is loaded (step 800). The Tree Builder module 358 determines (step 802) whether the user is continuing a previous session or starting anew. If continuing, the last saved state of the previous session is loaded (step 804). Next, the playback database is initialized and an empty tree is constructed (step 806). This involves creating the snapshot file, index file, and Treelist. The size of the empty tree in terms of snapshots is determined by the disk space allocated and the snapshot size specified in the User Interface module 350. The shape of the tree is driven by the aspect ratio. Based on the size and shape, the Search Driver module 354 calculates the number of trunk nodes, branch nodes, leaf nodes, and corresponding snapshots necessary to fully populate the tree.

After the empty tree is built, the Tree Builder module 358 will repeatedly receive (step 808) a snapshot from the Page Evaluator module 356 and insert it (step 810) into the tree by saving the snapshot to the snapshot file, creating a pointer to the snapshot in the index, and updating the Treelist to reflect the new tree structure. Once the tree is fully populated, the Search Driver module 354 is notified (step 812) and the Tree Builder module 358 exits (step 814).

For clarity of explanation, and by way of non-limiting example, the Search Driver module 354, Page Evaluator module 356, and Tree Climber module 358 may operate as follows to populate the presentation network of FIG. 4. The user may enter search parameters which are ascii characters expressing desired features according to the user's wishes, such as "Caribbean, islands, beaches". In this case, the sequence of the search terms indicates priority, and thus the user is interested in the Caribbean region, desires to see island features of the Caribbean, and desires to see beaches on these Caribbean islands.

The search request "Caribbean island beaches" is submitted to a commercial search engine such as Lycos or Alta Vista. There may be a variety of URLs to web pages matching these criteria. By way of fictitious example, assume that forty Web pages are returned, the highest four entries (as ranked by the search engine) being as follows:

[1] http://www.abc_islands.com/
[2] http://www.uniglobe_travel.com/tours/jamaica
[3] http://www.guns&ammo.com/us_defens/west_hemisph/haiti
[4] http://www.cuba_visitors.gov/welcome/

These pages are "placed along" the trunk nodes T1–T3 in an order. According to one preferred embodiment, this order is an alphabetical order by final URL descriptor (not including the "http" or "www" characters). Thus, the Web page at URL [1] above ("abc_islands") is placed at T1, the Web page URL [3] ("haiti") is placed at T2, and Web page at URL [2] ("Jamaica") is placed at T3. Note that Web page at URL [4] is simply dropped, along with the other 36 Web pages. This "dropping" of Web pages is one feature associated with a "lossy" database transform.

Trunk node T1, which is the only trunk node in FIG. 4 that will display its own "hold node" portion (as discussed supra), will be loaded with the best picture or snapshot on the "abc_islands.com" Web page. One method of determining the "best" picture on a Web page is as follows. As known in the art, pictures associated with Web pages are coded in html (hypertext markup language) as pointers to image files such as *.jpg or *.gif files, which usually have meaningful path names. Two fictitious pictures in the Web page at URL [1] above, which may be pictures of (a) an aerial view of an island, and (2) the face of a mayor of an island town, may be coded as:

[a] http://www.abc_islands.com/island.jpg
[b] http://www.abc_islands.com/mayor.jpg One method of determining the best picture is to analyze the names of these picture files against the search parameters. In this case, the trunk node T1 will contain the aerial picture of the island because this picture's name matches the user's search term "island".

After populating the trunk nodes, the first level of branch nodes B1–B6 is populated. As shown in the presentation network topology of FIG. 4, branch nodes B1 and B2 correspond to trunk node Ti, branch nodes B3 and B4 correspond to trunk node T2, and branch nodes B5 and B6 correspond to trunk node T3.

As is known in the art, most Web pages contain a list of pointers, called "links", which are simply the URLs of other Web pages which are either within that site or at another Web site. These other Web pages are usually associated in some logical way with the subject matter of the pointing Web page. According to one of the preferred embodiments, the branch nodes B1 and B2 are populated with pictures from Web pages (a) linked to the Web page occupying node T1 and (b) which rank highest in the original search terms. Thus, for example, suppose that the Web page at URL [1] contained the following links:

[i] http://www.abc_islands.com/antigua/
[ii] http://www.antigua_bureau.gov/
[iii]http://www.abc_islands.com/barbados/
[iv] http://www.suntours.com/caribbean/corazon/

The Web pages for each of these four URLs are examined and compared to the search criteria, preferably with the second most important term "island" having more weight than the others. It should be noted that some of these pages may have already been located as one of the 36 other Web pages which were previously "dropped." The top two ranking sites are used to populate the branch nodes B1 and B2. The step of locating the best snapshot at each site is similar to the steps described for trunk node T1. Nodes B3–B6 are populated in a similar manner.

If none of the Web pages [1]–[4] produces even a minimal match to the search terms, their links may be "followed" to produce other candidate Web pages. Further, in some cases, the Web page at trunk node T1 may have no pointers to other Web pages. When this happens, the search engine may be instructed to perform another new search, with the second term "island" being emphasized.

After the first layer of branch nodes B1–B6 is populated, the second layer of branch nodes B7–B18 is populated. Starting with nodes B7 and B8, the nodes B7–B18 are populated much in the same way as the nodes B1–B6 except they are one layer "deeper". For example, in choosing the candidate Web pages for nodes B7 and B8, the links on the Web page of the URL populating node B1 are examined, and the third search term "beaches" is emphasized. Leaf nodes L1–L24 are then populated in a similar manner.

Depending on the user's request and on the content of the source databases, it is to be appreciated that some nodes, in particular some leaf nodes, might be populated with irrelevant items. This can be seen as one by-product of a "lossy" database transform as described above, which may introduce some "noise" into the system. For example, during the populating of the leaf nodes, if the search engine does not return any Web pages having even a minimal match to the search terms, the leaf node may simply be populated with a random selection taken from the returned Web pages. As another example, a snapshot populating a node may be a picture which "technically" meets the search parameters, but would not meet the user's true desires. Thus, the Web page at the fictitious URL "http://www.guns&ammo.com/us_defens/ west_hemisph/haiti" may match the parameters "Caribbean islands beaches" quite well. However, this Web page may contain a news photograph of a U.S. soldier landing on a Haitian beach and holding an automatic rifle, content which was probably not the object of the user's request.

Importantly, the above procedure is one of many possible methods falling within the scope of the preferred embodiments. Many other search engines, prioritizing schemes, and snapshot selection schemes may be used.

Figure 9A:
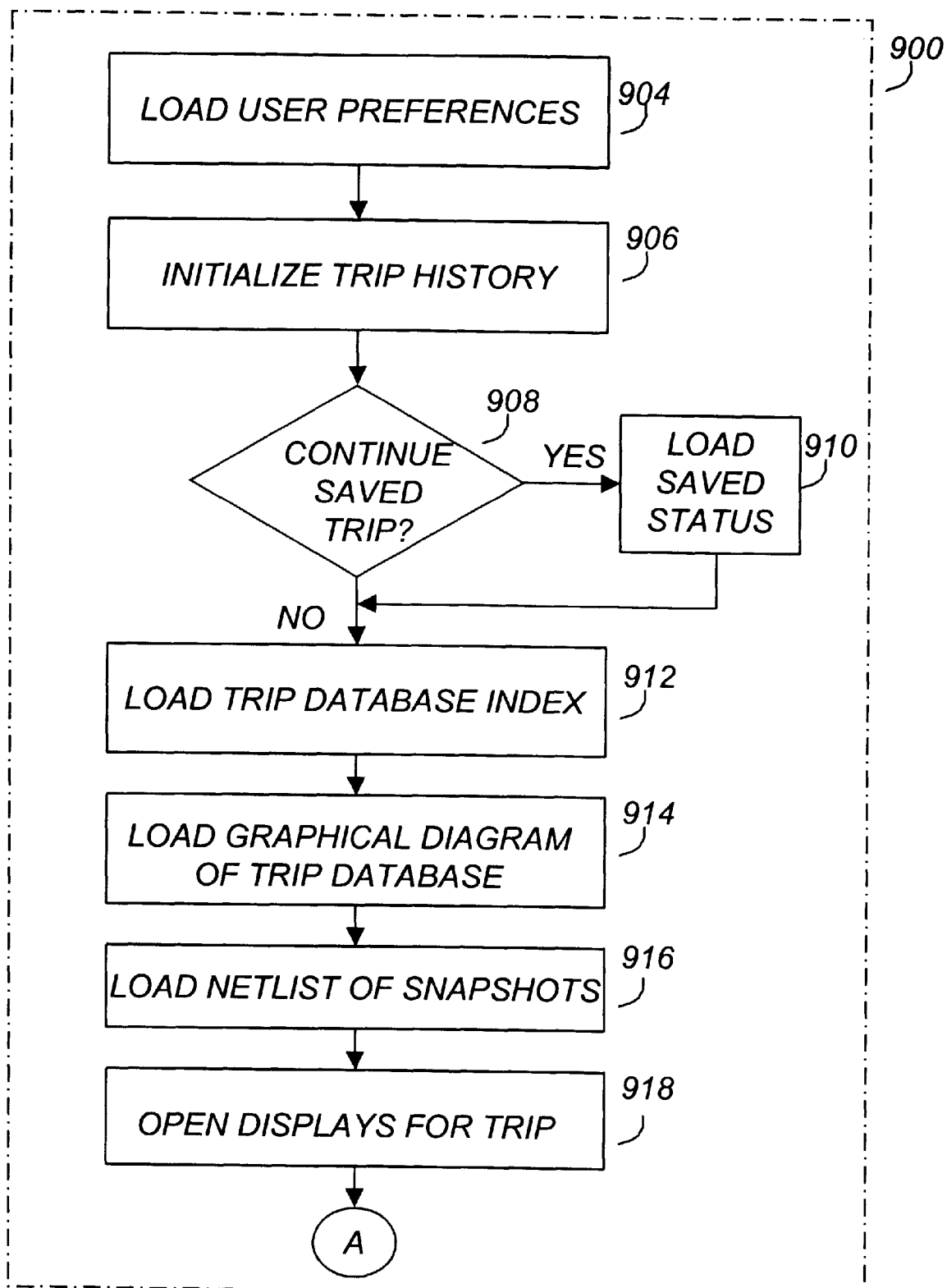
FIGS. 9A and 9B are flow charts illustrating steps taken by a Tree Climber module of FIG. 3.
Figure 9B:
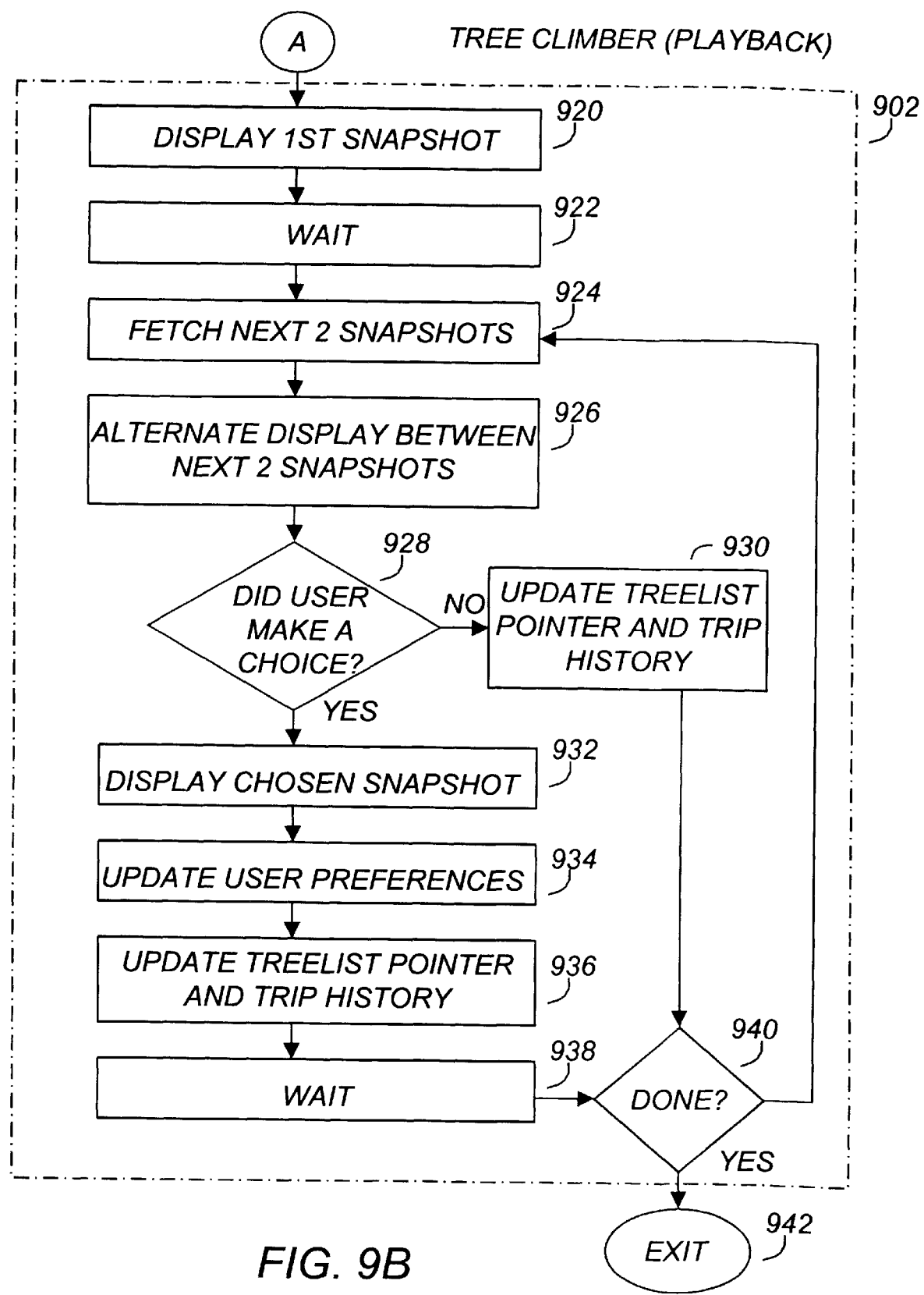

Tree Climber module 360 is now described. Referring to FIG. 9, Tree Climber module 360 operates in two stages: a setup stage 900 and a playback stage 902. Setup stage 900 commences with Tree Climber loading user preferences (step 904) and initializing the playback history (step 906). Tree Climber module 360 determines (step 908) whether the user is continuing a saved playback. If so, the status of the saved playback is loaded (step 910). The snapshot database index is loaded (step 912), a graphical diagram of the database is loaded (step 914), and a Treelist (i.e. a linked list of snapshots) is loaded (step 916). Finally, display windows are opened on monitor 102 (step 918).

The Tree Climber playback stage 902 commences with the display of a first snapshot (step 920). Tree Climber module 360 will pause (step 922) to allow the first snapshot to be viewed, after which or during which time the next two snapshots are fetched (step 924). The next two snapshots are alternately displayed (step 926), allowing the user to choose a preferred snapshot of the two. Tree Climber module 360 then determines (step 328) whether the user made a choice between the next two snapshots. If not, the Treelist pointer and playback history are updated (step 930). If the user did choose between the alternating snapshots, the chosen one is displayed (step 932). User preferences are then updated (step 934), the Treelist pointer and playback history are updated (step 936), and then the user's display is paused (step 938) to allow the new choice to be viewed. Following step 930 or 938, the Tree Climber module 360 determines (step 940) whether the playback is completed. If not, Tree Climber module 360 resumes (step 924); if completed, the Tree Climber module exits (step 942). One skilled in the art will recognize that the TreeClimber module 360 may use other methods of presenting the stored snapshots to the user, such as invoking a known web browser, without exceeding the scope of this invention.

It is to be appreciated that the Tree Climber module 360 may be adapted to operate on many different types of databases for serial presentation of the database items to the user. For example, Tree Climber module 360 may be adapted to play back a straight, hierarchical download of a set of Web sites. As another example, Tree Climber module 360 may be adapted to play back a locally-generated listing of files on the user's hard drive produced by the computer's operating system. In each case, Tree Climber module 360 is capable of provide an adaptive, serial presentation to the user, is capable of "learning" from the user's previous selections, and is capable of using its "learned" knowledge or "inertia" for automated presentation of items without affirmative user input.

Various embodiments have been described. The descriptions are intended as illustrations, not limitations. For example, within the scope of the present invention would be a method for database transformation and adaptive playback, the source database comprising biological or medical data items. The biological data items would comprise, for example, genetic information such as nucleic acid (DNA or RNA), amino acid sequences, genetic map coordinates or chromosomal linkage information, small molecules, or images of biological molecules. Thus, it will be apparent to those skilled in the art that modifications may be made to the invention as described without departing from the scope of the claims set out below.

APPENDIX A

1. USER INTERFACE MODULE

Definitions

5 menu
A list of user options or selections that can be made to appear by pressing the "menu" button on a TV remote control, or pulling down a window shade-style menu from a menu bar on a computer's video display, using a mouse-driven on-screen cursor and the mouse button. On a TV remote control, the "prog" button is used to move through the menu and the "enter" button is used to select the item. On a computer, a
10 mouse cursor and mouse button are used to move through the menu and select within it.

popup menu
A list of user options or selections that can be made to appear anywhere on the video display device superimposed on the main image of that video display during program playback.
15 The options or selections pertain to the playback process or the content being played back.

toolbar (aka control bar)
A region of a video display that displays a graphical representation of a control panel with controls. The controls may be selected for actuation by means of a computer
20 mouse and cursor, or a TV remote control's "prog" and "enter" buttons. The controls pertain to the setup, searching and playback processes.

foreground
Describes a program whose operations and output are visible on the display device while the program is running. Other operations may share the foreground if the system is capable
25 of multitasking, otherwise any other programs or tasks are placed on hold.

background
Describes a program whose operations are not visible on the display device while the program is running. Other operations run in the foreground on a multitasking system, or
30 the display device is used to present some other signal on a single-tasking system. For example, a standard TV signal is displayed on the CRT while the background operation uses the computer.

bookmark
A marker set by the user to indicate that a particular entry in a set of data items is of particular interest. A bookmark
35 may be used to quickly return to that data item at a later time, or be used to spare that item from a global deletion process, or be used as a basis for sorting.

keyword
A coefficient (parameter) of a filter that operates on
strings of ASCII text data. Keywords may be entered into the
system by typing at a keyboard, or by selecting from a pre-
existing list. Successively narrower sets of related
keywords may be generated by selecting from a hierarchical
set of lists. For example, if the word "dog" is selected
from the top level list in a hierarchy of lists, the next
list might have words such as "breed", "health", "kennels",
"dealers", and "history". If the keyword "breed" is
selected, the next list might have words such as "poodle",
"spaniel", "collie", etc. Examples of nested lists of
related words can be found in computer-based on-line
thesauruses.

inertia
The variable that controls the distance that the playback
engine will travel, without user input, along branches in the
synthetic network tree-like structure using the user's
profile data for guidance before a default path is taken.
The highest inertia setting will tend to play back all the
way to the end of a branch without defaulting at all.

defaults
The values stored as part of the program that are used in
lieu of user selections.

user profile
Variable values stored by the program in non-volatile memory
that are set either by the user directly, or by the program
based on decisions made by the user while the program is
running.

browser
A program used to navigate the Internet or similar networks
either on-line or off-line.

bitmap
A set of data representing the values of pixels in a two-
dimensional array, or raster.

node
A specific location in an n-dimensional network, defined by
the coordinates of the location, or an address in digital
memory followed by the data associated with that address.
All data in this class of networks exists within nodes.

page
An html page within a World Wide Web site.

Pseudocode
The following p-code is for a program built into a TV settop
box such as WebTV™, by Sony. No keyboard input is required.
Keyword sets are built by selecting words from nested lists of words. This embedded application is proposed for the sake
of code clarity. A similar interface can be created using
other operating systems and facilities.

Userface:
```
      display Control_Bar_1(Bitmaps: Bar, GoGet, Playback,
5         NewKeys, Setup, Exit)
      load(Defaults, User_profile)
```

Controls_1 (GoGet, Playback, NewKeys, Setup, Exit):
```
      wait for input
      if timeout, Exit
      else Controls_1
```

10 GoGet:
```
      if available, display last keyword set(Key_set_current =
          Key_set_previous)
      else display default keyword set(Key_set_current =
          Key_set_1)
      highlight GoGet button
      highlight NewKeys button
15    Wait:
          wait for input
          if timeout Exit
          if GoGet is selected, run in background,
              Search_Driver
          if NewKeys is selected, NewKeys
          else Wait
```

20 Search_Driver:
```
      call Browser(key_set_current)
      receive(html, .gif, .jpg)
      call Page_Eval(User_profile, html, .gif, .jpg)
          if Page is OK, call
              Snapshot_formatter(snapshot_out)
          else Search_Driver
25    call TreeBuilder(snapshot_in)
          if all nodes are filled, run in foreground,
              Controls_1
          else Search_Driver
```

NewKeys:
```
      display keyword list(key_list_n)
      wait for input
30    if timeout, Controls_1
      if user selects Exit button, save Key_set_current,
          Controls_1
      else save selected keyword, set pointer to next keyword
          list, NewKeys
```

Playback:
```
35    Get pointer to base of Tree
      if no Tree available, display error message, Controls_1
      else, call TreeClimber(tree_pointer)
      Controls_1
```

- 52 -

```
    Setup:
         display Control_Bar_2(Bitmaps: Bar, Hold_time,
              Flip_time, Storage, Keysets,
              Tree_shape, Inertia, Back)

Controls_2 (Hold_time, Flip_time, Storage, Keysets,
5        Tree_shape, Inertia, Back):
         wait for input
         if timeout, Controls_1
         else Controls_2

Hold_time:
         display Hold_time_list(integers: 1 to 100)
         highlight current value
10       wait for input
         if timeout, Controls_2
         else set Hold_time to user's selection, highlight value,
              Controls_2

Flip_time:
         display Flip_time_list(integers: 1 to 10)
15       highlight current value
         wait for input
         if timeout, Controls_2
         else set Flip_time to user's selection, highlight value,
              Controls_2

Storage:
         display Storage_allocation_list(integers: 1 to 1000)
20       highlight current value
         wait for input
         if timeout, Controls_2
         else set Storage_allocation to user's selection,
              highlight value, Controls_2

Keysets:
25       display Key_set_list(Key_set_1,..Key_set_n)
         highlight current Key_set
         wait for input
         if timeout, Controls_2
         else set Key_set_current to user's selection, highlight
              Key_set, Controls_2

30  Tree_shape:
         display Tree_shapes(bitmaps: Tree_1..Tree_n))
         highlight current Tree_shape
         wait for input
         if timeout, Controls_2
         else set Tree_shape to user's selection, highlight
              Tree_shape, Controls_2

35  Inertia:
         display Inertia_list(integers: 1 to 10)
         highlight current value
         wait for input
```

```
          if timeout, Controls_2
          else set Inertia to user's selection, highlight value,
              Controls_2

Back:
          Controls_1
 5
     Exit:
          exit application, return to OpSys

2.   SEARCH DRIVER MODULE

10   Definitions connect_time_limit
     The variable representing the amount of time the that the
     Search Driver is allowed to use to locate and retrieve data
     from the source network (the Web, for example).

15   connect_bandwidth
     The variable representing the amount of data that the Search
     Driver can retrieve per second of connect time from the
     source network.

scope
     The variable that determines the distance into the source
     database the Search Driver will search.  For example, there
20   are about 68 million web pages, worldwide.  Scope might be
     set to 10 million, which could be any range of 10 million
     within the 68 million.

decimation factor
     The variable that determines the rate of decimation of
     addresses within any given scope.  For example, if the scope
25   of an Internet search is 10 million addresses and decimation
     is set to 100, every 100th site will be searched, for a total
     of 100,000 sites within the scope of search.

Pseudocode

30   The following program is called by the User Interface Module,
     after the network interface is established.  It is run until
     the TreeBuilder Module sends the message to halt, after
     filling all positions in the synthetic network.

Search_Driver:
          load(user_profile, defaults)
          if new_search(false), then load(saved_state),
35
     Fetch_Tnodes
```

```
            initialize(scope, decimation_factor, keyword_list,
                Browser, Search Engine,
                Tnodes, Bnodes, Leaves)

Fetch_Tnodes:
            if halt(true), then Exit, else
 5          send(keyword_list)
            receive(URL_list)
            decimate(URL_list), save(Short_list)
            connect to(Short_list_address_n), receive(html)
            output to Page_Eval(html)
            get Page_Eval(evaluation)
            if evaluation(true)
10                  then update(keyword_list, Short_list_address),
                        decrement(Tnode)
                        if (Tnode = 0), reset(Short_list),
                            Fetch_Bnodes
                        else Fetch_Tnodes
            else Fetch_Tnodes Fetch_Bnodes:
15          if halt(true), then Exit, else
            send(keyword_list)
            receive(URL_list)
            decimate(URL_list), save(Short_list)
            connect to(Short_list_address_n), receive(html)
            output to Page_Eval(html)
            get Page_Eval(evaluation)
            if evaluation(true)
20                  then update(keyword_list, Short_list_address),
                        decrement(Bnode)
                        if (Bnode = 0), reset(Short_list),
                            Fetch_Leaves
                        else Fetch_Bnodes
            else Fetch_Bnodes 25  Fetch_Leaves:
            if halt(true), then Exit, else
            send(keyword_list)
            receive(URL_list)
            decimate(URL_list), save(Short_list)
            connect to(Short_list_address_n), receive(html)
            output to Page_Eval(html)
30          get Page_Eval(evaluation)
            if evaluation(true)
                    then update(keyword list, Short_list_address),
                        decrement(Leaves)
                        if (Leaves = 0), reset(Short_list), Exit
                        else Fetch_Leaves
            else Fetch_Leaves 35  Exit:
            return to caller
```

3. PAGE EVALUATOR MODULE

Definitions snapshot_size
The variable representing the amount of snapshot data that the Snapshot Formatter is allowed to save per snapshot. Typically set by the user.

acceptance_threshold
The variable representing the quality of the match between the keyword set and the html file (or other source file format) retrieved by Search Driver. The acceptance threshold is set by default to 128 for a 5-keyword set, 256 for a 6-keyword set, etc. The user may adjust the threshold during setup. For example, a 5-keyword set has the keyword match values of 128, 96, 64, 32, 16 where a match of the first keyword scores 128, the second 96, etc. So, an html page that matches the second and third keyword will score 96 + 64 = 160.

storage_allocation
The variable that determines how much storage space will be allocated to the entire synthetic network database on a specific storage physical device, or logical storage device.

snapshot_partitions
This is a set of variables that determine how much data may be stored for each class of data within a formatted Snapshot. Depending on the user's preferences, all of the classes may be used, or any subset. The storage classes are image_data, text_data, audio_data, movie_data, program_data, html_data. When a class is "required" by the user, the snapshot_size must be large enough to contain one instance of each required class. When all classes are enabled as "optional" by the user, classes are selected for inclusion into the Snapshot based on priority and fit.

Pseudocode

The following program is run in parallel with the Search Driver Module and the TreeBuilder Module. For the sake of code clarity, it is assumed the user has set the filter parameters to accept only images.

```
Page_Eval:
    load(user_profile, defaults)
    initialize(snapshot_size, snapshot_partitions,
            page_scoring)

New_page:
    input(html_page)
```

```
        If whole_html(on)
            then compare(html_size, snapshot_size)
                if (html_size > snapshot_size), New_page
                else Evaluate
            else set snapshot_partitions(part_type_image)

5   Evaluate:
        compare(keyword_set, html_page)
        get(match_score)
        compare(match_score, acceptance_threshold)
        if (match_score > acceptance_threshold), Filter
        else New_page 10  Filter:
        if whole_html(on), Format
        else mask(html, part_type_image)
        compare(*.jpg_size, part_type_image_size)
        if (*.jpg < image_size), save *.jpg,
            subtract(*.jpg_size, image_size), next *.jpg,
            Filter
        else compare(*.gif_size, part_type_image_size)
15      if (*.gif < image_size), save *.gif,
            subtract(*.gif_size, image_size), next *.gif,
            Filter
        else compare(*.bmp_size, part_type_image_size)
        if (*.bmp < image_size), save *.bmp,
            subtract(*.bmp_size, image_size), next *.bmp,
            Filter 20  Format:
        if whole_html(on), save html, output(URL, match_score,
            html), Check_done
        else concatenate(images), save image_set
        output(URL, match_score, image_set)

Check_done:
25      if halt(true), Exit, else New_page

Exit:
        return to caller
```

4.  TREE BUILDER MODULE

Definitions

Snapshot
The bit-mapped image of a web page stored within a database file on hard disk. The snapshot may contain all of the data from a specific web page, or only a subset of that data. An example of a subset is one selected picture in JPEG or GIF format with an accompanying paragraph describing the contents of the picture in ASCII text format.

disk_allocation
The variable representing the amount of hard disk drive data storage space (in megabytes) that TreeBuilder is allowed to fill.

connect_time_limit
The variable representing the amount of time the that the Search Driver Module is allowed to use to locate and retrieve data from the source network (the Web, for example).

connect_bandwidth
The variable representing the amount of data that the Search Driver can (or is targeted to) retrieve per second of connect time from the source network.

snapshot_size
The variable representing the amount of snapshot data that the Snapshot Formatter is allowed to save per snapshot.

netlist
The structured list of ASCII text data that defines the interconnections between all nodes and snapshots in the Database Tree.

tree_pointer
The variable that points to the address of the next entry in the synthetic network tree structure. For example, a pointer to an element in the netlist.

B_NODE
A Branch Node in the Database Tree has one input and three outputs. The input is connected to the previous Branch Node or Trunk Node in the Tree. Two of the outputs are connected to the next two Branches in the Tree, or two Leaves if the branch is fully extended, and the third, default output is connected to the previous Trunk Node in the Database Tree. The default will be taken if the user fails to select one of the next two elements in the Tree.

T_NODE
A Trunk Node in the Database Tree has two inputs and three outputs. The first input is connected to the previous Trunk Node in the Tree, or the start of the tree. The second input is connected to multiple outputs of Leaves or Branch Nodes, thus providing a return path for end-of-branch conditions or defaults. Two of the outputs are connected to the next two Branch Nodes in the Tree, or two leaves if there are no branches specified. The third, default output, is connected to the next Trunk Node in the Tree, or back to the first Trunk Node in the Tree if the Trunk Node is at the end of the Tree, thus providing recirculation.

LEAF
A Leaf in the Database Tree has one input and one output. Leaves contain the Snapshot Data that is displayed to the user. If the Leaf is on a branch, but not at the end of a
branch, the output of the Leaf is connected to the input of
the next Branch Node on the Tree. If the Leaf is at the end
of a branch on the Tree, or attached directly to a Trunk
which has no branches, the leaf output is connected to the
input of the next Trunk Node on the Tree. If there are no
further Trunk Nodes, the Leaf output is then connected to the
input of the first Trunk Node in the Tree, thus providing
recirculation.

width, W
A variable in the range of 1 to 256 (one byte). A value of 1
represents a low setting. This is one of two values used to
calculate tree shape.

depth, D
A variable in the range of 1 to 256 (one byte). A value of 1
represents a low setting.
This is one of two values used to calculate tree shape.

pruning
The process of removing data items, or links (pointers) from
a database or network.

link synthesis (pointer synthesis)
The process of creating a new link to connect data items or
nodes in a network to each other, where the link either never
existed, or intervening indirect links are replaced with a
direct link.

tree shape or aspect ratio
Synthetic networks created by this module vary in shape
according to the variables width and depth. The following
lookup table used in the psuedocode, below, contains entries
for nine trees having different shapes. The table was
generated from the user-preferences parameters width, depth,
snapshot_size and storage_allocation. Internet connect-time
is unrestrained. Storage_allocation is set to 103MB, max.
Snapshot_size is set to 50KB. Width and depth are
manipulated for maximum range, given the storage constraint.

Lookup Table (9 Trees of Less Than 103 MB @ 50 KB/Snapshot)

| Tree | W | D | Tnodes | Bnodes | Bnodes/Tnodes | Snapshots |
|------|-----|-----|--------|--------|---------------|-----------|
| 1 | 1 | 256 | 1024 | 0 | N/A | 2049 |
| 2 | 2 | 128 | 204 | 408 | 2 | 2041 |
| 3 | 4 | 64 | 146 | 876 | 6 | 2045 |
| 4 | 8 | 32 | 68 | 952 | 14 | 2041 |
| 5 | 16 | 16 | 34 | 1020 | 30 | 2041 |
| 6 | 32 | 8 | 16 | 992 | 62 | 1995 |
| 7 | 64 | 4 | 8 | 1008 | 126 | 2017 |
| 8 | 128 | 2 | 4 | 1016 | 254 | 2033 |
| 9 | 256 | 1 | 1 | 1022 | 1022 | 2045 |

Pseudocode

The following program uses a precalculated tree, selected by the user from among nine distinct tree shapes (refer to lookup table, above). The tree is filled sequentially, in order of trunk, branches, then leaves. Alternatively, the same results can be obtained by filling one trunk node, then all the branch nodes springing from it, then all the leaves on all those branches. Then, the next trunk node is filled, etc. The program is somewhat longer that way, but will run faster if the data is being fetched from the Internet, since there will be less recursion in Internet addressing.

```
TreeBuilder:
    load(user_profile, defaults)
    if user has elected to continue a previous Tree,
        load(netlist, tree_pointer)
            calculate(number_of_Tnodes, number_of_Bnodes,
                number_of_snapshots), Trunk_nodes
    else, initialize(number_of_Tnodes, number_of_Bnodes,
        number_of_snapshots, tree_pointer)

Trunk_nodes:
    call Page_Eval(snapshot)
    get pointer to next Tnode(tree_pointer)
    insert snapshot identifier at Tnode
    update(netlist, snapshot_index, tree_pointer)
    if all Tnodes are filled, Branch_nodes
    else Trunk_nodes Branch_nodes:
    call Page_Eval(snapshot)
    get pointer to next Bnode(tree_pointer)
    insert snapshot identifier at Bnode
    update(netlist, snapshot_index, tree_pointer)
    if all Bnodes are filled, Leaf_nodes
    else Branch_nodes Leaf_nodes:
    call Page_Eval(snapshot)
    get pointer to next Leaf(tree_pointer)
    insert snapshot identifier at Leaf
    update(netlist, snapshot_index, tree_pointer)
    if all Leaves are filled, Exit
    else Leaf_nodes Exit:
    halt(Page_Eval, Search_Driver)
    return to caller
```

5. TREE CLIMBER MODULE

Definitions

Snapshot
The bit-mapped image of a web page stored within a database file on hard disk. The snapshot may contain all of the data from a specific web page, including the html, or only a subset of that data. An example of a subset is one selected picture in JPEG or GIF format with an accompanying paragraph describing the contents of the picture in ASCII text format.

Keyword set, keyword set weights
Keywords are the user-selected or default set of words that are used by Search Driver to locate potential web pages and by Page Evaluator to evaluate web page data for possible inclusion in a Snapshot. The user may assign importance to the keywords on a scale of 1 to 128. The selected value is then referred to as the weight of the keyword. If the user does not weight the keywords, default weights in descending logarithmic order, starting with the first keyword are assigned. As the user plays back a synthetic network tree, TreeClimber adjusts the keyword weights to reflect the user's actual preferences, as determined by comparing the current keyword weights with the page match score.

Web page keyword weight matching score (match_score)
Every web page snapshot stored in the synthetic network database has a Page Evaluator-created keyword set matching score associated with it. For a 3-keyword example, if all the keywords (or synonyms) in the user's keyword set are found in the web page, the matching scores would be 128, 96, 64. If only the second keyword matched, the score would be 0, 96, 0.

Autoplay
The feature within synthetic network database playback that selects and plays back a path through the database structure that most closely matches the user's current keyword set weights. If the user has not provided any input at all during playback, the keyword set weights remain as initially set by the user or the default weighting.

User preferences
The variables that can be set by the user before and/or during main operations, including window size, foreground/background operation, snapshot extent (full page data or subset page), hard disk space allocation, connection time limit, page display hold time, branch choice flip rate, keyword set, keyword set weights, tree display window on/off, and autoplay feature on/off.

tree picture
The graphic image of the synthetic network tree-like
structure, represented as a two or three dimensional
schematic drawing suitable for display on a computer monitor
or television set.

Pseudocode

The following program is the real-time playback module called
by the User Interface Module. When finished or paused, the
program returns to the User Interface Module.

TreeClimber:
```
    load(user_profile, defaults, netlist, database index,
    tree_pointer, tree_picture)
    Initialize all variables
    open(snapshot_window)
    if tree_picture(on), open(tree_graphics_ window)
    else, Playback_1
```

Playback_1:
```
    if Pause Button(on), call Userface
    else load(tree_pointer, nodes, database index,
    snapshot_n, snapshot_n+1,
    snapshot_n+2)
    display (snapshot_n)
    wait(hold_time)
    display(snapshot_n+1)
    get user input(A)
    wait(flip_time)
    display(snapshot_n+2)
    get user input(B)
    if A or B, update(user_profile, tree_pointer, database
        index)
    else (default, tree_pointer, database index)
    display(snapshot_n+1)
    wait(flip_time)
    display(snapshot_n+2)
    wait(flip_time)
    update(tree_pointer, history)
    if nodes(SUM = Tnodes + Bnodes + Leaves), Exit
    else tree_pointer(Tnode_1), load(next snapshots)
```

Playback_2:
```
    if Pause Button(on), call Userface
    display (snapshot_n)
    wait(hold_time)
    display(snapshot_n+1)
    get user input(A)
    wait(flip_time)
    display(snapshot_n+2)
    get user input(B)
    wait(flip_time)
```

```
            if A or B, update(user_profile, keyword weights,
                tree_pointer, database index)
            else if autoplay(on), Autoplay
            else load default(tree_pointer, database index)
            display(snapshot_n+1)
            wait(flip_time)
 5          display(snapshot_n+2)
            update(tree_pointer, history)
            if nodes(SUM = Tnodes + Bnodes + Leaves), Exit
            else tree_pointer(Tnode_1), load(next snapshots),
                Playback_2

Autoplay:
            if Pause Button(on), call Userface
 10         else if intertia( = 0), Playback_2
            else display (snapshot_n)
            wait(hold_time)
            display(snapshot_n+1)
            wait(flip_time)
            display(snapshot_n+2)
            wait(flip_time)
 15         decrement(inertia)

BestMatch:
            load(next_node)
            compare(keyword_weights, user_profile)
            if match_score( > threshhold), set(tree_pointer),
                load(next snapshots), Show
 20         else, BestMatch Show:
            display(snapshot_n+1)
            wait(flip_time)
            display(snapshot_n+2)
            update(tree_pointer, history)
            if nodes(SUM = Tnodes + Bnodes + Leaves), Exit
 25         else tree_pointer(Tnode_1), load(next snapshots),
                Autoplay Exit:
            return to caller
```

What is claimed is:

1. A method for reorganizing and presenting information from a first database, the first database comprising a plurality of data items, comprising the steps of:

receiving one or more selection parameters;

selecting a subset of data items in said first database, said subset being chosen according to said selection parameters, said step of selecting a subset of data items comprising the step of invoking an automated search engine for automatically searching said first database using said selection parameters;

creating a second database comprising a plurality of data pointers, each data pointer pointing to a data item of said subset of data items, said data pointers being arranged according to a presentation network topology, said presentation network topology being determined according to said selection parameters and the data content of said data items; and presenting said subset of data items in a time sequence, said time sequence being determined according to said presentation network topology and according to at least one playback instruction.

2. The method of claim 1, wherein said first database comprises the Internet;

wherein said step of presenting is performed on a local computer coupled to the Internet; and wherein said automated search engine is an Internet search engine.

3. The method of claim 2, wherein said subset of data items is played back one data item at a time; and wherein said data items are downloaded from the Internet onto said local computer prior to said step of presenting.

4. The method of claim 3, said presentation network topology comprising a plurality of nodes, each node comprising a unique entry identifier, one of said data pointers, and a plurality of exit pointers including a first exit pointer, a second exit pointer, and a default exit pointer, each exit pointer comprising the entry identifier of a node different from the node containing that exit pointer, said plurality of nodes including a start node, said step of presenting said subset of data items comprising:

presenting a start node data item, said start node data item corresponding to the data item pointed to by said start node data pointer;

after presenting said start node data item, receiving a first playback command, said first playback command being equal to one of a plurality of playback options comprising a first pointer command, a second pointer command, and a null command; and presenting a first subsequent node data item to the user, said first subsequent node data item corresponding to the data item pointed to by a first subsequent node data pointer, said first subsequent node having an entry identifier equal to (a) said first exit pointer of said start node if said first playback command is equal to said first pointer command, (b) said second exit pointer of said start node if said first playback command is equal to said second pointer command, or (c) said default exit pointer of said start node if said first playback command is equal to said null command.

5. The method of claim 4, said step of presenting said subset of data items further comprising:

presenting an Nth node data item;

after presenting said Nth data item, receiving an Nth playback command;

presenting an (N+1)th data item corresponding to an (N+1)th node, said (N+1)th node data item corresponding to the data item pointed to by said (N+1)th node data pointer, said (N+1)th node having an entry identifier equal to (a) said first pointer of said Nth node if said Nth playback command is equal to said first pointer command, (b) said second pointer of said Nth node if said Nth playback command is equal to said second pointer command, or (c) said default exit pointer of said Nth node if said Nth playback command is equal to said null command.

6. The method of claim 5, said step of receiving said corresponding playback command comprising the steps of:

for a first time interval, previewing a portion of a data item corresponding to the data pointer of a node pointed to by said first exit pointer for a first time interval;

for a second time interval, previewing a portion of a data item corresponding to the data pointer of a node pointed to by said second exit pointer for a second time interval different than said first time interval;

receiving a command;

wherein said first pointer command is indicated if said command is received during said first time interval, and wherein said second pointer command is indicated if said command is received during said second time interval.

7. The method of claim 6, wherein said first time interval sequentially alternates with said second time interval, and wherein said null command is indicated if said command is not received within either of said first or second time intervals.

8. The method of claim 7, wherein said command is received as a single-stroke user keyboard input.

9. The method of claim 4, wherein said step of creating said second database comprises the step of downloading a data item from said first database into said second database, said data item being pointed to by at least one of said plurality of data pointers.

10. The method of claim 9, wherein said step of creating said second database comprises the step of, for each of said plurality of data pointers, downloading the data item from said first database which is pointed to by that data pointer, whereby only data items which are already contained in said second database are presented during said step of presenting said subset of data items.

11. The method of claim 5, said presentation network topology having a tree structure, each of said nodes being one of a trunk node, branch node, or leaf node, said presentation network topology comprising a primary path formed by a series combination of trunk nodes, each trunk node having a first entry identifier and a second entry identifier, wherein the default exit pointer of each trunk node points to the first entry identifier of a different trunk node.

12. The method of claim 11, said presentation network topology further comprising a plurality of secondary paths coupled to said primary path at said trunk nodes and comprising at least one branch node or leaf node, wherein said branch nodes each comprise a single entry identifier pointed to by an exit pointer of a trunk node or another branch node or a branch node, said branch nodes each comprise an exit pointer pointing to a leaf node, said leaf nodes each comprise a single entry identifier pointed to by an exit pointer of a trunk node or a branch node, and said leaf nodes each comprise an exit pointer pointing to the second entry identifier of a trunk node.

13. The method of claim 12, said selection parameters comprising a hierarchy of selection criteria from a most important selection criterion to a least important selection criterion, said step of selecting comprising the steps of:

selecting said subset of data items according to said selection parameters; and computing a quality metric for each data item with respect to said hierarchy of selection criteria.

14. The method of claim 13, said step of creating said second database comprising the steps of:

assigning a network presentation topology node to each of said subsets of data items, wherein data items having a high quality metric with respect to most important selection criteria correspond to said trunk nodes along said primary path.

15. The method of claim 13, said step of creating said second database comprising the steps of:

assigning a network presentation topology node to each of said subsets of data items, wherein data items having higher quality metrics with respect to more important selection criteria generally correspond to nodes which are closer to said primary path than data items having lower quality metrics with respect to less important selection criteria.

16. The method of claim 15, wherein said presentation network topology comprises:

a tree depth corresponding to the number of trunk nodes placed in series;

a tree width corresponding to an average number of branch nodes and leaf nodes originating at each trunk node;

a tree size corresponding to the total amount of data pointed to by all tree nodes; and an aspect ratio corresponding to the tree depth divided by the tree width;

wherein said method for reorganizing and presenting information further comprises the steps of receiving a desired tree size and a desired aspect ratio and forming said second database responsive thereto.

17. The method of claim 12, wherein said step of presenting said subset of data items comprises the step of automatically selecting said first or second exit pointer if the previous M playback commands were each equal to the null command, said automatic selection being based on playback commands preceding said previous M playback commands.

18. The method of claim 12, wherein said step of presenting said subset of data items comprises the step of, upon an explicit autoplay instruction or upon M sequential null playback commands, adaptively selecting a third exit pointer different from said first and second exit pointers, for jumping to a nonadjacent tree node according to an adaptive algorithm.

19. The method of claim 18, wherein said adaptive algorithm may be customized to both current preferences and historical preferences of a user.

20. A method for presenting information from a presentation database, said presentation database comprising a subset of data items selected from a source database using an automated search engine and arranged into a presentation network topology, comprising the step of presenting said subset of data items in a time sequence, said time sequence being determined according to said presentation network topology and according to a series of playback instructions comprising affirmative commands and null commands, wherein upon a first command, an automated playback sequence is presented to the user, said automated sequence being determined according to past playback instructions issued by the user.

21. The method of claim 20, wherein said first command comprises a sequence of null commands.

22. The method of claim 21, wherein said first command comprises an affirmative autoplay command.

23. A method for processing information from the Internet, comprising the steps of:

receiving one or more selection parameters;

selecting a subset of data items from the Internet using an Internet search engine, said subset being chosen according to said selection parameters; and creating a second database comprising a plurality of data pointers, each data pointer pointing to a data item of said subset of data items, said data pointers being arranged according to a presentation network topology, said presentation network topology being determined according to said selection parameters and the data content of said data items.

24. The method of claim 23, further comprising the step of presenting said subset of data items in a time sequence, said time sequence being determined according to said presentation network topology and according to at least one playback instruction.

25. The method of claim 24, said presentation network topology comprising:

a plurality of nodes, each node comprising a unique entry identifier, a one of said data pointers, and an exit pointer, each exit pointer comprising the entry identifier of a node different from the node containing that exit pointer; and a start node;

wherein said step of presenting said subset of data items comprises a first step of presenting a start node data item, said start node data item corresponding to the data item pointed to by said start node data pointer.

26. The method of claim 25, said step of presenting said subset of data items further comprising:

presenting a subsequent node data item, said subsequent node data item corresponding to the data item pointed to by said subsequent node data pointer, said subsequent node having an entry identifier equal to said exit pointer of said start node.

27. The method of claim 26, each node having a plurality of exit pointers including a first exit pointer, a second exit pointer, and a default exit pointer, said step of presenting said subset of data items further comprising:

after presenting said start node data item, receiving a first playback command, said first playback command being equal to one of plurality of playback options comprising a first pointer command, a second pointer command, and a null command;

presenting a first subsequent node data item to the user, said first subsequent node data item corresponding to the data item pointed to by said first subsequent node data pointer, said first subsequent node having an entry identifier equal to (a) said first pointer of said start node if said first playback command is equal to said first pointer command, (b) said second pointer of said start node if said first playback command is equal to said second pointer command, or (c) said default exit pointer of said start node if said first playback command is equal to said null command.

28. The method of claim 27, said step of presenting said subset of data items further comprising:

presenting an Nth node data item;

after presenting said Nth data item, receiving an Nth playback command;

presenting an (N+1)th data item corresponding to an (N+1)th node, said (N+1)th node data item corresponding to the data item pointed to by said (N+1)th node data pointer, said (N+1)th node having an entry identifier equal to (a) said first pointer of said Nth node if said Nth playback command is equal to said first pointer command, (b) said second pointer of said Nth node if said Nth playback command is equal to said second pointer command, or (c) said default exit pointer of said Nth node if said Nth playback command is equal to said null command.

29. The method of claim 28, wherein said step of presenting said subset of data items comprises the step of, upon an explicit autoplay instruction or upon M sequential null playback commands, adaptively selecting a third exit pointer different from said first and second exit pointer, for jumping to a nonadjacent node according to an adaptive algorithm.

30. The method of claim 29, wherein said adaptive algorithm may be customized to both current preferences and historical preferences of a user.

31. A method for presenting data contained in a first database according to the desired subject parameters of a user, comprising the steps of:

using an automated search engine to select from a first database containing spatially oriented data a subset of data items according to said desired subject parameters;

arranging a playback tree for representing an interactive playback experience, said playback tree comprising nodes for presenting data items, issuing intermediate playback options, and receiving intermediate playback instructions;

presenting the subset of data items to the user according to the playback tree;

whereby said first database containing spatially oriented data is transformed for seamless time-oriented playback to the user one data item at a time.

32. The method of claim 31, said playback tree comprising a primary path of trunk nodes and a plurality of secondary paths comprising branch and leaf nodes, whereby said branch and leaf nodes correspond to data items further from the desired subject parameters, and wherein branch paths may be followed during playback only upon affirmative playback command issued by the user.

33. The method of claim 32, wherein said trunk nodes correspond to data items closer to the desired subject parameters, and wherein said trunk nodes are serially presented to the user if only null playback instructions are issued by the user.

34. The method of claim 33, wherein adaptive playback tree sequences may be presented to the user according to past playback instructions issued by the user, for allowing automated presentation of branch and leaf nodes upon the issuance of null commands from the user.

* * * * *